US010110278B2

(12) United States Patent
Lin et al.

(10) Patent No.: US 10,110,278 B2
(45) Date of Patent: Oct. 23, 2018

(54) TECHNIQUES FOR WIRELESS CHARGING COMMUNICATION

(71) Applicant: INTEL CORPORATION, Santa Clara, CA (US)

(72) Inventors: Xintian E. Lin, Mountain View, CA (US); Sreenivas Kasturi, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 945 days.

(21) Appl. No.: 14/498,997

(22) Filed: Sep. 26, 2014

(65) Prior Publication Data

US 2015/0256226 A1 Sep. 10, 2015

Related U.S. Application Data

(60) Provisional application No. 61/950,181, filed on Mar. 9, 2014.

(51) Int. Cl.
*H04B 5/00* (2006.01)
*H02J 7/02* (2016.01)
*H02J 5/00* (2016.01)
*H02J 50/12* (2016.01)
*H02J 50/80* (2016.01)
*H02J 50/90* (2016.01)
*H02J 17/00* (2006.01)

(52) U.S. Cl.
CPC ............ *H04B 5/0037* (2013.01); *H02J 7/025* (2013.01); *H02J 50/12* (2016.02); *H02J 50/80* (2016.02); *H02J 50/90* (2016.02); *H02J 17/00* (2013.01); *H04B 5/0031* (2013.01); *H04B 5/0075* (2013.01)

(58) Field of Classification Search
CPC .. H04B 5/0037; H04B 5/0075; H04B 5/0031; H02J 50/10
See application file for complete search history.

(56) References Cited

U.S. PATENT DOCUMENTS

| 2011/0304583 A1* | 12/2011 | Kruglick | G06F 3/044 345/174 |
| 2012/0274154 A1* | 11/2012 | DeLuca | H02J 17/00 307/149 |
| 2012/0280862 A1* | 11/2012 | Moffatt | G01S 13/765 342/386 |
| 2013/0065584 A1 | 3/2013 | Lyon et al. | |
| 2013/0090061 A1 | 4/2013 | Linde | |
| 2013/0288600 A1 | 10/2013 | Kuusilinna et al. | |

(Continued)

FOREIGN PATENT DOCUMENTS

EP 2518863 10/2012

OTHER PUBLICATIONS

International Search Report and Written opinion received for PCT Patent Application No. PCT/US2015/018883, dated May 28, 2015, 11 pages.

(Continued)

*Primary Examiner* — Jared Fureman
*Assistant Examiner* — Emmanuel R Dominique

(57) ABSTRACT

Wireless charging communication examples are described. Various techniques for establishing a communication link between a power transmit unit and a power receive unit through a low energy wireless communication interface to enable the power receive unit to receive power are described.

22 Claims, 14 Drawing Sheets

(56) References Cited

U.S. PATENT DOCUMENTS

| 2014/0062395 A1* | 3/2014 | Kwon | H02J 50/60 |
| | | | 320/108 |
| 2014/0159653 A1 | 6/2014 | Von Novak et al. | |
| 2015/0133056 A1* | 5/2015 | Kang | H02J 50/10 |
| | | | 455/41.2 |

OTHER PUBLICATIONS

Extended European Search Report received for European Patent Application No. 15761452.0, dated Oct. 27, 2017, 11 pages.
"A4WP Wireless Power Transfer System Baseline System Specification (BSS)", Alliance for Wireless Power, Version 1.1.2, Nov. 14, 2013, 98 pages.

* cited by examiner

700

---

DETECT, AT A PTU CAPABLE OF INDUCTIVELY, MAGNETICALLY OR WIRELESSLY TRANSFERRING POWER TO ONE OR MORE PRUs, A FIRST PRU BASED ON USE OF A TRANSMITTED SHORT BEACON TO DETECT AN IMPEDANCE OR CHARGING LOAD ASSOCIATED WITH THE FIRST PRU
702

---

TRANSMIT A LONG BEACON AND INCLUDING A FIRSTMODULATED SIGNATURE IN THE LONG BEACON, THE LONG BEACON TO CAUSE THE FIRST PRU TO ENERGIZE A LOW ENERGY WIRELESS COMMUNICATION INTERFACE
704

---

RECEIVE AN ADV PACKET FROM THE FIRST PRU
706

---

SENDING A CONNECTION REQUEST TO ESTABLISH A FIRST COMMUNICATION LINK WITH THE FIRST PRU THROUGH THE LOW ENERGY WIRELESS COMMUNICATION LINK WHEN THE ADV PACKET FROM THE FIRST PRU INCLUDES A SIGNATURE THAT MATCHES THE FIRST MODULATED SIGNATURE
708

---

TRANSFER POWER TO THE FIRST PRU WHILE MAINTAINING THE FIRST COMMUNICATION LINK
710

DETECT, AT A PTU CAPABLE OF INDUCTIVELY, MAGNETICALLY OR WIRELESSLY TRANSFERRING POWER TO ONE OR MORE PRUs, A FIRST PRU BASED ON USE OF A TRANSMITTED SHORT BEACON TO DETECT AN IMPEDANCE OR CHARGING LOAD ASSOCIATED WITH THE FIRST PRU
802

TRANSMIT A LONG BEACON TO CAUSE THE FIRST PRU TO ENERGIZE A LOW ENERGY WIRELESS COMMUNICATION INTERFACE
804

RECEIVE A FIRST ADV PACKET FROM THE FIRST PRU INCLUDING FIELDS INDICATING SUPPORT FOR FORWARD SIGNALING AND NO SIGNATURE FIELD
806

MODULATE A REMAINING PORTION OF THE LONG BEACON RESPONSIVE TO RECEIVING THE FIRST ADV PACKET, THE REMAINING PORTION OF THE LONG BEACON MODULATED TO INCLUDE A MODULATED SIGNATURE
808

RECEIVE A SECOND ADV PACKET FROM THE FIRST PRU
810

SENDING A CONNECTION REQUEST TO ESTABLISH A FIRST COMMUNICATION LINK WITH THE FIRST PRU THROUGH THE LOW ENERGY WIRELESS COMMUNICATION INTERFACE WHEN THE SECOND ADV PACKET INCLUDES A SIGNATURE THAT MATCHES THE MODULATED SIGNATURE INCLUDED IN THE REMAINING PORTION OF THE LONG BEACON
812

TRANSFER POWER TO THE FIRST PRU WHILE MAINTAINING THE FIRST COMMUNICATION LINK
814

FIG. 8

Storage Medium 900

*Computer Executable Instructions for 700/800*

```
┌─────────────────────────────────────────────────────────────┐
│  RECEIVE, AT A PRU, A LONG BEACON INCLUDING A MODULATED      │
│  SIGNATURE THAT IDENTIFIES A PTU CAPABLE OF INDUCTIVELY,     │
│  MAGNETICALLY OR WIRELESSLY TRANSFERRING POWER TO THE PRU    │
│                          1102                                │
└─────────────────────────────────────────────────────────────┘
                              │
┌─────────────────────────────────────────────────────────────┐
│   ENERGIZE A LOW ENERGY WIRELESS COMMUNICATION INTERFACE     │
│        RESPONSIVE TO RECEIVING THE LONG BEACON               │
│                          1104                                │
└─────────────────────────────────────────────────────────────┘
                              │
┌─────────────────────────────────────────────────────────────┐
│                DECODE THE MODULATED SIGNATURE                │
│                          1106                                │
└─────────────────────────────────────────────────────────────┘
                              │
┌─────────────────────────────────────────────────────────────┐
│   GENERATE AN ADVERTISEMENT (ADV) PACKET THAT INCLUDES THE   │
│                     DECODED SIGNATURE                        │
│                          1108                                │
└─────────────────────────────────────────────────────────────┘
                              │
┌─────────────────────────────────────────────────────────────┐
│    TRANSMIT THE ADV PACKET TO THE PTU TO ESTABLISH A         │
│  COMMUNICATION LINK WITH THE PTU THROUGH THE LOW ENERGY      │
│              WIRELESS COMMUNICATION INTERFACE                │
│                          1110                                │
└─────────────────────────────────────────────────────────────┘
                              │
┌─────────────────────────────────────────────────────────────┐
│     RECEIVE POWER FROM THE PTU WHILE MAINTAINING THE         │
│                   COMMUNICATION LINK                         │
│                          1112                                │
└─────────────────────────────────────────────────────────────┘
```

- RECEIVE, AT A PRU, A LONG BEACON FROM A PTU CAPABLE OF INDUCTIVELY, MAGNETICALLY OR WIRELESSLY TRANSFERRING POWER TO THE PRU
  1202

- ENERGIZE A LOW ENERGY WIRELESS COMMUNICATION INTERFACE RESPONSIVE TO RECEIVING THE LONG BEACON
  1204

- GENERATE A FIRST ADV PACKET, THE FIRST ADV PACKET INCLUDING FIELDS INDICATING SUPPORT FOR FORWARD SIGNALING AND NO SIGNATURE FIELD
  1206

- TRANSMIT THE FIRST ADV PACKET TO THE PTU, THE PTU CAPABLE OF MODULATING A REMAINING PORTION OF THE LONG BEACON TO INCLUDE A MODULATED SIGNATURE RESPONSIVE TO RECEIVING THE FIRST ADV
  1208

- DECODE THE MODULATED SIGNATURE INCLUDED IN THE REMAINING PORTION OF THE LONG BEACON
  1210

- GENERATE A SECOND ADV PACKET THAT INCLUDES THE DECODED SIGNATURE
  1212

- TRANSMITTING THE SECOND ADV PACKET TO THE PTU TO ESTABLISH A COMMUNICATION LINK WITH THE PTU THROUGH THE LOW ENERGY WIRELESS COMMUNICATION INTERFACE LINK
  1214

- RECEIVE POWER FROM THE PTU WHILE MAINTAINING THE COMMUNICATION LINK
  1216

*FIG. 12*

Storage Medium *1300*

Computer Executable Instructions for 1100/1200

FIG. 13

TECHNIQUES FOR WIRELESS CHARGING COMMUNICATION

RELATED CASE

This application claims priority to U.S. Provisional Patent Application No. 61/950,181 filed on Mar. 9, 2014, that is hereby incorporated by reference in its entirety.

TECHNICAL FIELD

Examples described herein are generally related to wirelessly or inductively transferring power between devices or units.

BACKGROUND

Wireless power transfer may include wirelessly or inductively transferring power via non-radiative, near-field magnetic resonance. In some examples, wireless power transfer may be defined as a resonant wireless transfer of power through magnetic induction between coils located at a power transmit unit (PTU) and coils located at a power receive unit (PRU). The transferred power received at the PRU may enable wireless charging of a battery for types of portable devices such as headsets, smart phones, portable game or media players, game controllers, tablets, netbooks, notebooks, etc.

BRIEF DESCRIPTION OF THE DRAWINGS

FIG. 7 illustrates an example of a first logic flow.
FIG. 8 illustrates an example of a second logic flow.
FIG. 9 illustrates an example of a first storage medium.
FIG. 11 illustrates an example of a third logic flow.
FIG. 12 illustrates an example of a fourth logic flow.
FIG. 13 illustrates an example of a second storage medium.

DETAILED DESCRIPTION

Figure 1:
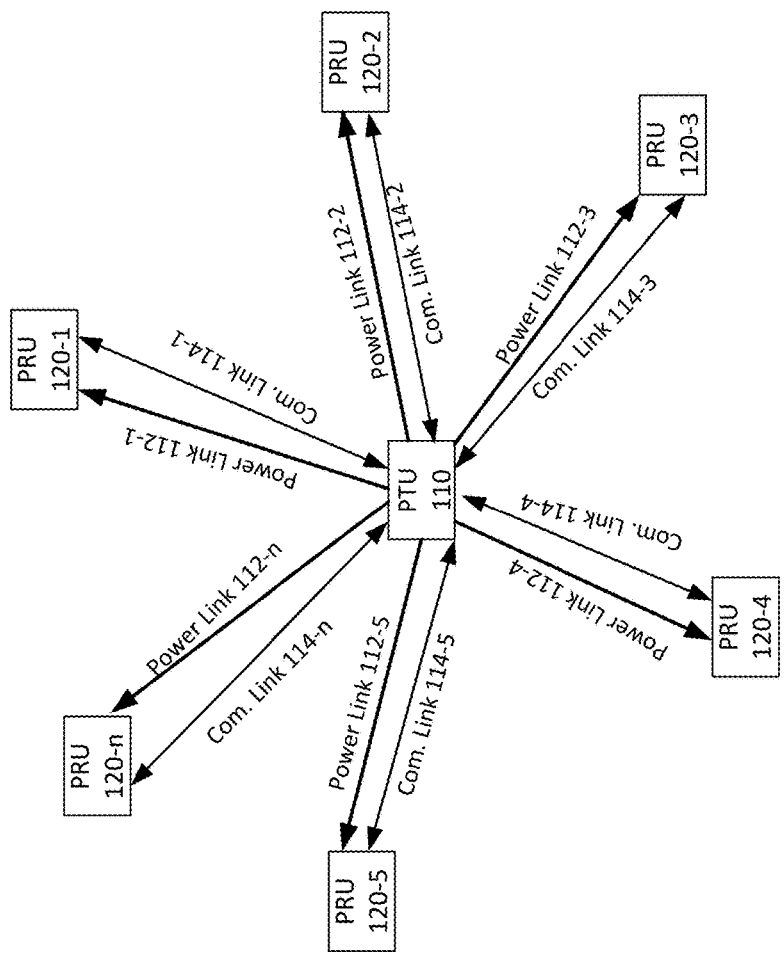
FIG. 1 illustrates an example of a first system.

Examples are generally directed to techniques for wireless charging communication. Recent collaborative efforts to develop standards for wireless charging have led to multiple wireless charging standards such one approved by the Alliance for Wireless Power ("A4WP"). An example wireless standard approved by A4WP is "Version 1.0 Baseline System Specification (BSS)", published in January 2013 ("the A4WP standard"). The A4WP standard is based on magnetic resonant charging. Charger utilizes impedance/load detection to sense device under charge and use of Bluetooth® low energy (BLE) radio to communicate. Power beacons may be generated by circuitry at a power transmit unit (PTU) in accordance both the A4WP standard and/or the Bluetooth Specification, Version 4.1, published in December 2013 and/or later versions or revisions ("the BLE standard"). Impedance/load detection via use of power beacons according to the A4WP standard may determine a relationship (e.g., relative locations) between the PTU and one or more power receive units (PRUs). Due to some inherent difficulties associated with impedance/load detection and BLE advertisement packet (ADV) received signal strength indicator (RSSI) fluctuation, it may be difficult to determine which PRU under charge is powered by the PTU. An occasional cross connect may occur that results in the PTU connecting to a remote PRU that may be within BLE ADV range but not physically located close enough for wireless charging. It is with respect to these and other challenges that the examples described herein are needed.

According to some examples, example first methods may be implemented at a PTU. For these example first methods, the PTU may be capable of inductively, magnetically or wirelessly transferring power to one or more PRUs. The PTU may detect a first PRU based on use of a transmitted short beacon (e.g., a A4WP short beacon) to detect an impedance or charging load associated with the first PRU. Also, for these example first methods, a long beacon (e.g., an A4WP long beacon) may be transmitted that includes a modulated signature. The long beacon may cause the first PRU to energize a low energy wireless communication interface (e.g., a BLE interface). An advertisement (ADV) packet may be received from the first PRU. A connection request may then be sent to establish a communication link with the first PRU through the low energy wireless communication link when the ADV packet includes a signature that matches the modulated signature. Power may then be transferred to the first PRU while maintaining the communication link.

In some other examples, example second methods may be implemented at a PTU. For these example second methods, the PTU may be capable of inductively, magnetically or wirelessly transferring power to one or more PRUs. The PTU may detect a first PRU based on use of a transmitted short beacon to detect an impedance or charging load associated with the first PRU. Also, for these example second methods, a long beacon may be transmitted to cause the first PRU to energize a low energy wireless communication interface. A first ADV packet may be received from the first PRU including fields indicating support for forward signaling and no signature field. A remaining portion of the long beacon may be modulated responsive to receiving the first ADV packet. The remaining portion of the long beacon may be modulated to include a modulated signature. A second ADV packet may be received from the first PRU. A connection request to establish a communication link with the first PRU may then be sent through the low energy wireless communication interface when the second ADV packet includes a signature that matches the modulated signature included in the the remaining portion of the long beacon. Power may then be transferred to the first PRU while maintaining the communication link.

According to some other examples, example third methods may be implemented at a PRU. For these example third methods, the PRU may receive a long beacon that includes a modulated signature that identifies a PTU capable of inductively, magnetically or wirelessly transferring power to the PRU. A low energy wireless communication interface may be energized responsive to receiving the long beacon. The modulated signature may be decoded and an ADV packet may be generated that includes the decoded signature. Also, for these example third methods, the ADV packet may be transmitted to the PTU to establish a communication link with the PTU through the low energy wireless communication interface. Power may then be received from the PTU while maintaining the communication link.

According to some other examples, example fourth methods may be implemented at a PRU. For these example fourth methods, the PRU may receive a long beacon from a PTU capable of inductively, magnetically or wirelessly transferring power to the PRU. A low energy wireless communication interface may be energized responsive to receiving the long beacon and a first ADV packet may be generated and then transmitted to the PTU, the first ADV packet including fields indicating support for forward signaling and no signature field. Also, for these example fourth methods, the PTU may be capable of modulating a remaining portion of the long beacon to include a modulated signature responsive to receiving the first ADV. The modulated signature included in the remaining portion of the long beacon may be decoded and a second ADV packet may be generated that includes the decoded signature. The second ADV packet may be transmitted to the PTU to establish a communication link with the PTU through the low energy wireless communication interface. Power may then be received from the PTU while maintaining the communication link.

FIG. 1 illustrates an example first system. In some examples, the example first system includes system 100. System 100, as shown in FIG. 1, includes a power transmit unit (PTU) 110 to interact with one or more power receive units (PRUs) 120-1 to 120-n, where "n" is any positive integer greater than 1. According some examples, power links 112-1 to 112-n and communication links 114-1 to 114-n may allow for physical and functional interactions between PTU 110 and PRUs 120-1 to 120-n. The physical interaction may include PTU 110 wirelessly, magnetically or inductively transferring power to any one of PRUs 120-1 to 120-n via respective power links 112-1 to 112-n. The functional interaction may occur over communication links 114-1 to 114-n and logic and/or features of PTU 110 or PRUs 120-1 to 120-n may be capable of conducting such functional interactions as session or power control management through low power wireless communication interfaces over these communication links.

Figure 2:
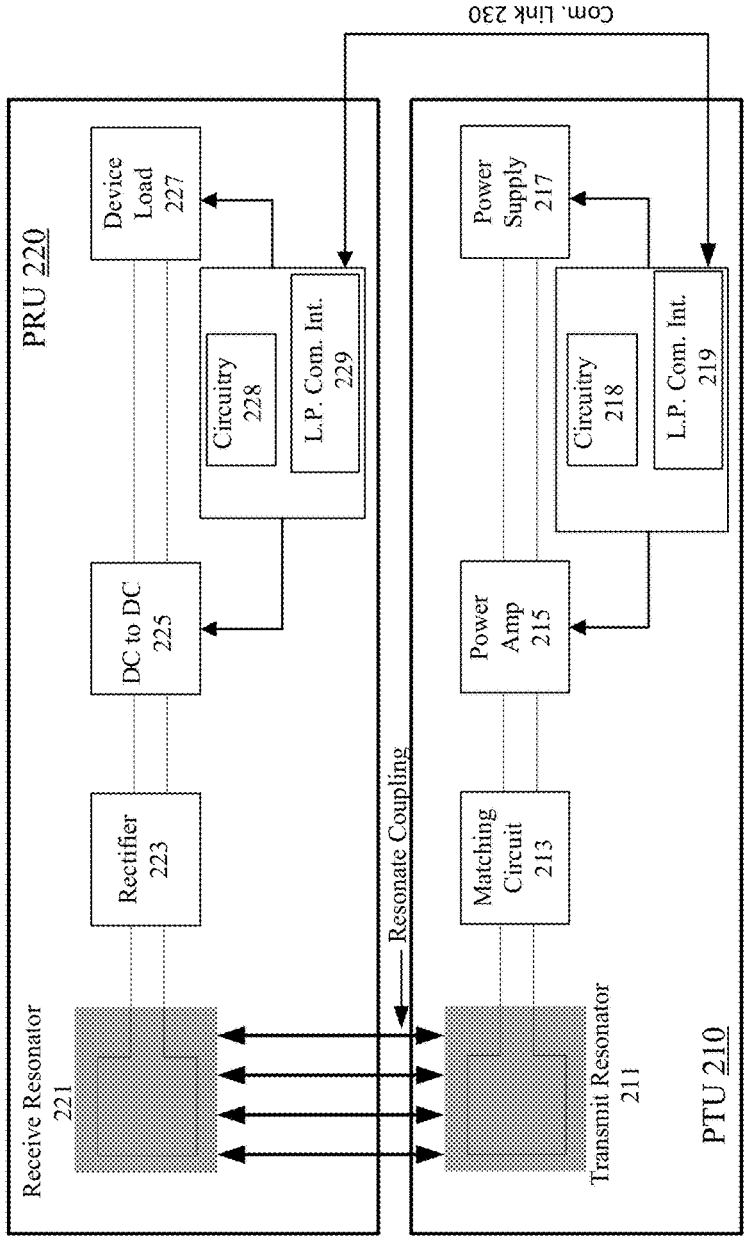
FIG. 2 illustrates an example of a second system.

FIG. 2 illustrates an example second system. In some examples, the example second system includes system 200. System 200 as shown in FIG. 2 includes a PTU 210 and a PRU 220. According to some examples, PTU 210 and PRU 220 may be configured in compliance with one or more standards for wirelessly, magnetically or inductively charging a device load such as the A4WP standard.

In some examples, as shown in FIG. 2, PTU 210 includes a transmit resonator 211, a matching circuit 213, a power amplifier 215, a power supply 217 or a low power wireless communication interface 219. Also, as shown in FIG. 2, PRU 220 includes a receive resonator 221, a rectifier 223, a direct current (DC) to DC 225, a device load 227 or a low power wireless communication interface 229. For these examples, transmit resonator 211 may be capable of wireless power transfer via resonate coupling to receive resonator 221 at an operating frequency in the industrial, scientific and medical (ISM) radio band that may include, but is not limited to, 6.78 megahertz (MHz). Power supply 217 may supply the power, power amp 215 may adjust the power to be provided and matching circuit 213 may match impedance to assist with the power transfer from transmit resonator 211. Also, for these examples, rectifier 223 may be used to convert the power received via receive resonator 221 from an alternating current (AC) to a direct current (DC), DC to DC 225 may assist in providing a DC load to device load 227.

According to some examples, control information to facilitate wireless power transfer may be exchanged between PTU 210 and PRU 220 over communication link 230. For these examples, low power wireless communication interface 219 of PTU 210 and low power wireless communication interface 229 of PRU 220 may be configured or arranged to be operated by logic or features of circuitry 218 and 228, respectively, according to the BLE standard. Circuitry 218 or 228 and may capable of sending packets through low power wireless communication interfaces 219 or 229 and over communication link 230 using a management protocol according to the A4WP standard and/or the BLE standard. As described more below, this may include the use of BLE ADV and connection request packets.

Figure 3:
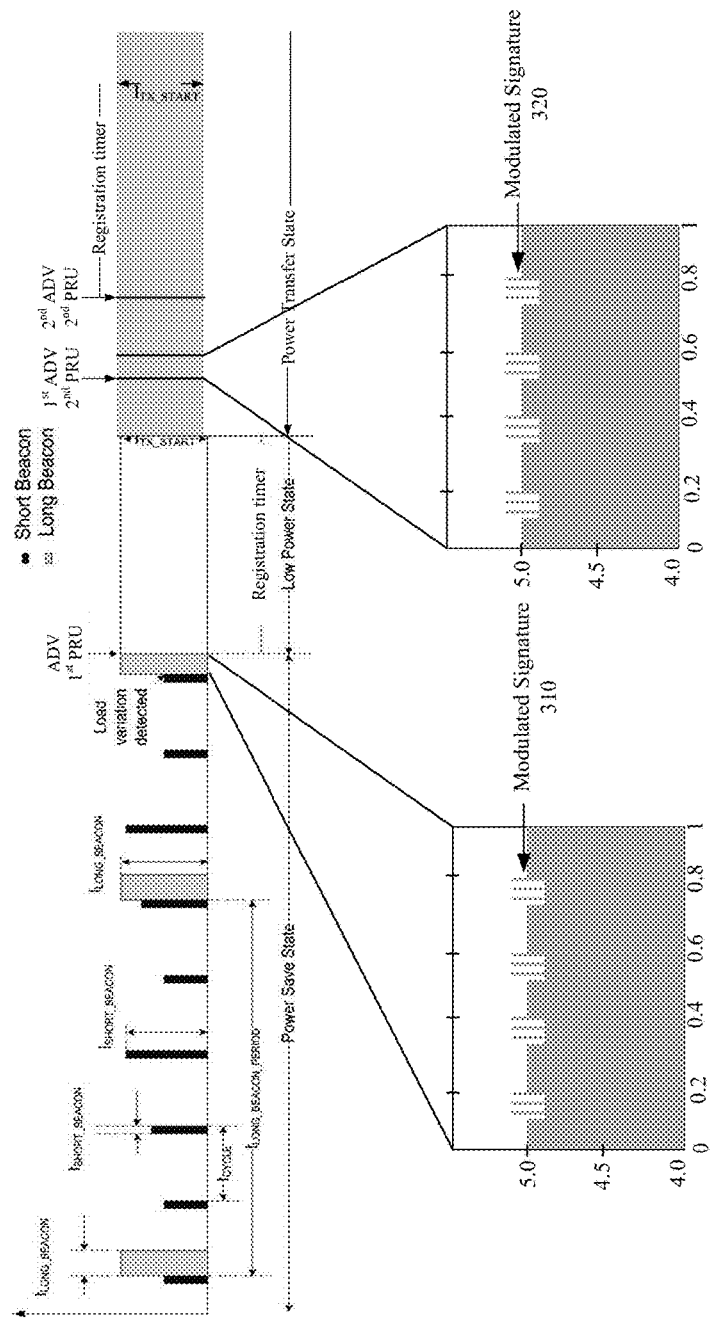
FIG. 3 illustrates an example first beacon structure.

FIG. 3 illustrates an example first beacon structure. As shown in FIG. 3, the example first beacon structure includes beacon structure 300. In some examples, beacon structure 300 may be a beacon structure for a PTU (e.g., PTU 210) arranged according to the A4WP standard. For these examples, a periodic long beacon may be required of the PTU to cause one or more PRUs (e.g., PRU 220) to at least enable or energize a low power wireless (e.g., BLE) communication interface. For example, short beacons may be transmitted and used by the PTU for impedance/load detection of PRUs while in a power save state. If a load is detected for a first PRU, then a long beacon may be concatenated with a short beacon to cause the circuitry (e.g., circuitry 228) at the first PRU to energize its low power wireless communication interface.

According to some examples, to avoid or reduce the possibility of cross connect issues with other PTUs possibly in range of the detected first PRU, a modulated signature 310 may be added to the long beacon as shown in FIG. 3. Modulated signature 310, for example, may be used to determine if a first detected PRU is sending an ADV packet in response to its long beacon. For these examples, as shown in FIG. 3, modulated signature 310 may include a sequence of 010101 modulated on an amplitude of the long beacon. The disclosure is not limited to modulation on the amplitude of the long beacon, other modulation schemes, like frequency modulation, phase modulation, etc. are contemplated. In some examples, the sequence modulated on the amplitude of the long beacon may be generated randomly to reduce the possibility that other PTUs are using the same sequence and/or provide a somewhat unique identifier for each PTU capable of generating modulated signatures.

In some examples, the detected first PRU may be capable of receiving the modulation signature 310 and decode modulated signature 310 to determine the sequence 010101. For these examples, logic or features at the first PRU may then include the signature 010101 in an ADV packet and send the ADV packet to the PTU. Also, for these examples, when the PTU receives a given ADV packet, only ADV packets having a signature that matches a given modulated signature causes the PTU to transition from a power save state to a low power state and attempt to establish a first communication link to facilitate a wireless power transfer to the first PRU.

According to some examples, the PTU may transition to the lower power state and establish a first communication link to facilitate a wireless power transfer to the first PRU. The PTU may then transition to a power transfer state to provide power to the first PRU while maintaining the first communication link. For these examples, because the PTU is wirelessly providing power to the first PRU, a second PRU could energize its low energy wireless communication interface via the wireless power source, generate a first ADV packet and send a first ADV packet to the PTU. However, this first ADV packet from the second PRU may lack a signature as the PTU may have yet to send a modulated signature to the second PRU. Responsive to receiving the first ADV packet from the second PTU without a signature, the PRU may modulate power (e.g., above and below 5.0 volts) provided to the first PRU to generate modulated signature 320. Modulated signature 320 may include a same sequence of 010101 as shown in FIG. 3, although, in other examples, a different sequence may be included.

In some examples, the power may be modulated to generate modulated signature 320 for a fixed period of time. The second PRU may include logic and/or features to detect/receive this power modulation, decode modulated signature 320, generate a second ADV packet that includes the decoded signature 010101 and then send the second ADV packet to the PTU. When the PTU receives the second ADV packet with matching signature from the second PRU the PTU may attempt to establish a second communication link to facilitate a wireless power transfer to the second PRU. For these examples, as shown in FIG. 3, the PTU will stay in power transfer state if the registration is successful within the registration timer limit. Otherwise, the PTU may reattempt the registration or go to fault state.

According to some examples, subsequent PRUs may attempt to receive power from the PTU while the PTU is wirelessly transferring power to the first and/or second PRUs in a similar manner to how the second PTU did so as mentioned above.

In some other examples, the PTU may have either wirelessly transferred enough power to the first and second PRUs or the first and second PRUs may have been moved away from the PTU. In either case, the PTU may transition to a power save state. For these examples, a subsequent PRU may attempt to receive power from the PTU in a similar manner to how the first PTU did as mentioned above for FIG. 3.

Figure 4:
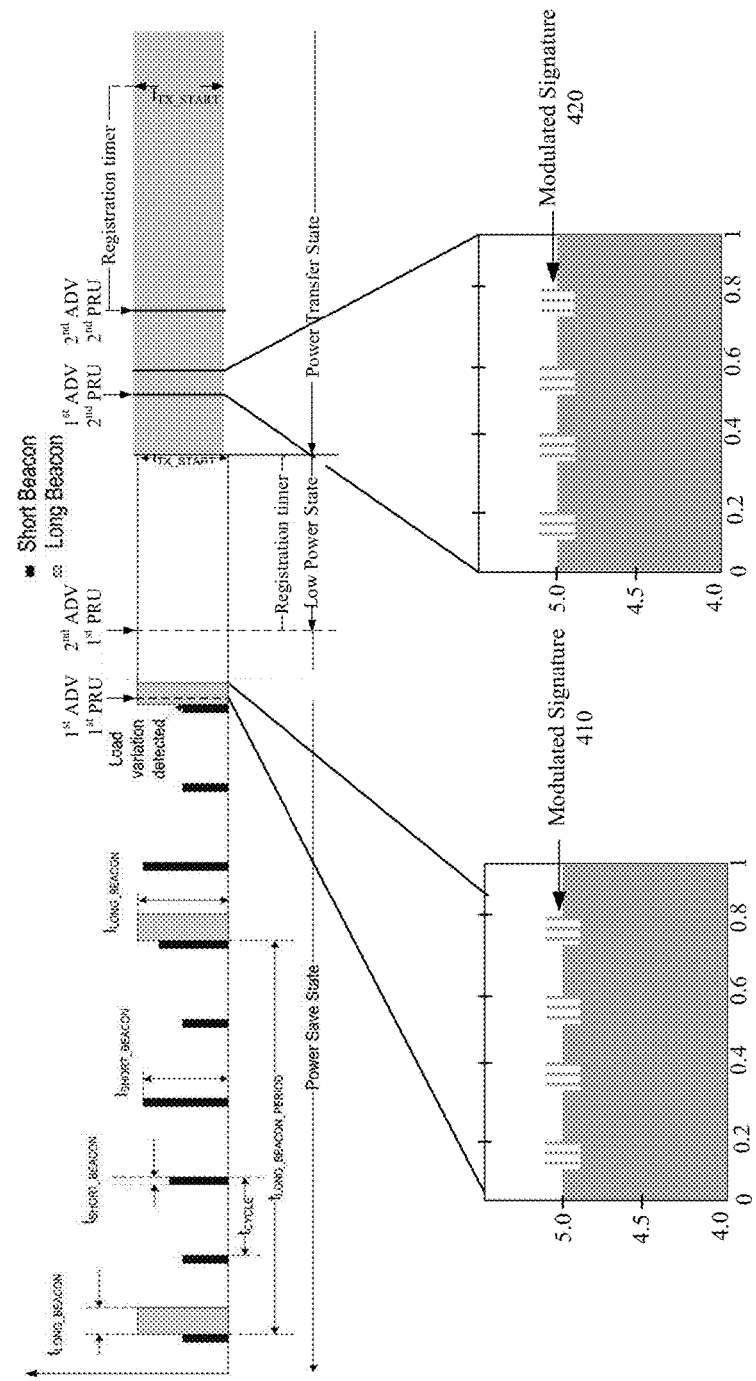
FIG. 4 illustrates an example second beacon structure.

FIG. 4 illustrates an example second beacon structure. As shown in FIG. 4, the example second beacon structure includes beacon structure 400. In some examples, beacon structure 400 may be a beacon structure for a PTU (e.g., PTU 210) arranged according to the A4WP standard. For these examples, a periodic long beacon may be required of the PTU to cause one or more PRUs (e.g., PRU 220) to at least enable or energize a low power wireless (e.g., BLE) communication interface. For example, short beacons may be transmitted and used by the PTU for impedance/load detection of PRUs while in a power save state. If a load is detected for a first PRU, then a long beacon may be concatenated with a short beacon to cause the circuitry (e.g., circuitry 228) at the first PRU to energize its low power wireless communication interface.

According to some examples, rather than including a modulated signal in a long beacon after detecting a first PRU as shown in FIG. 3, the PTU may wait to receive a first ADV packet from the detected first PRU. For these examples, the first ADV may not include a signature decoded from a received modulated signature. Responsive to receiving the first ADV without a signature, the PTU may generate modulated signature 410 after receiving the first ADV as shown in FIG. 4. Modulated signature 410, for example, may be included in a remaining portion of the long beacon may be used to determine if the detected first PRU is sending a second ADV packet in response to its modulation of the remaining portion. For these examples, as shown in FIG. 4, modulated signature 410 may include a sequence of 010101 modulated on an amplitude of the remaining portion of the long beacon.

In some examples, although not shown in FIG. 4, the first PRU may have previously received a long beacon having a modulated signal that included the same sequence of 010101. For these examples, the sequence of 010101 may be a unique identifier of the PTU and the first PRU may include that sequence in the first ADV. The PTU responsive to receiving an ADV including the matching identifier may then transition to the low power state and attempt to establish a first communication link with the first PRU. Thus, for these examples, modulation of the long beacon that includes modulated signature 410 may not be needed to cause the PTU to transition to the low power state.

According to some examples, the PTU may transition to the lower power state and establish a first communication link to facilitate a wireless power transfer to the first PRU. The PTU may then transition to a power transfer state to provide power to the first PRU while maintaining the first communication link. For these examples, because the PRU is wirelessly providing power to the first PRU, a second PRU could energize its low energy wireless communication interface via the wireless power source, generate a first ADV packet that includes fields indicating support for forward signaling and send a first ADV packet to the PTU. However, this first ADV packet from the second PRU may lack a signature field as the PTU may have yet to send a modulated signature to the second PRU. Responsive to receiving the first ADV packet including fields indicating support for forward signaling and no signature field from the second PTU the PRU may modulate power provided to the first PRU to generate modulated signature 420. Modulated signature 420 may include a same sequence of 010101 as shown in FIG. 4, although, in other examples, a different sequence may be included.

In some examples, the power may be modulated to generate modulated signature 420 for a fixed period of time. The second PRU may include logic and/or features to detect/receive this power modulation, decode modulated signature 420, generate a second ADV packet that includes a signature 010101 in a signature field and then send the second ADV packet to the PTU. When the PTU receives the second ADV packet from the second PRU the PTU may attempt to establish a second communication link to facilitate a wireless power transfer to the second PRU. For these examples, as shown in FIG. 4, the start of wireless power transfer for the second PRU may be begin following a registration timer.

According to some examples, subsequent PRUs may attempt to receive power from the PTU while the PTU is wirelessly transferring power to the first and/or second PRUs in a similar manner to how the second PTU did so as mentioned above.

In some other examples, the PTU may have either wirelessly transferred enough power to the first and second PRUs or the first and second PRUs may have been moved away from the PTU. In either case, the PTU may transition to a power save state. For these examples, a subsequent PRU may attempt to receive power from the PTU in a similar manner to how the first PTU did as mentioned above for FIG. 4.

Figure 5:
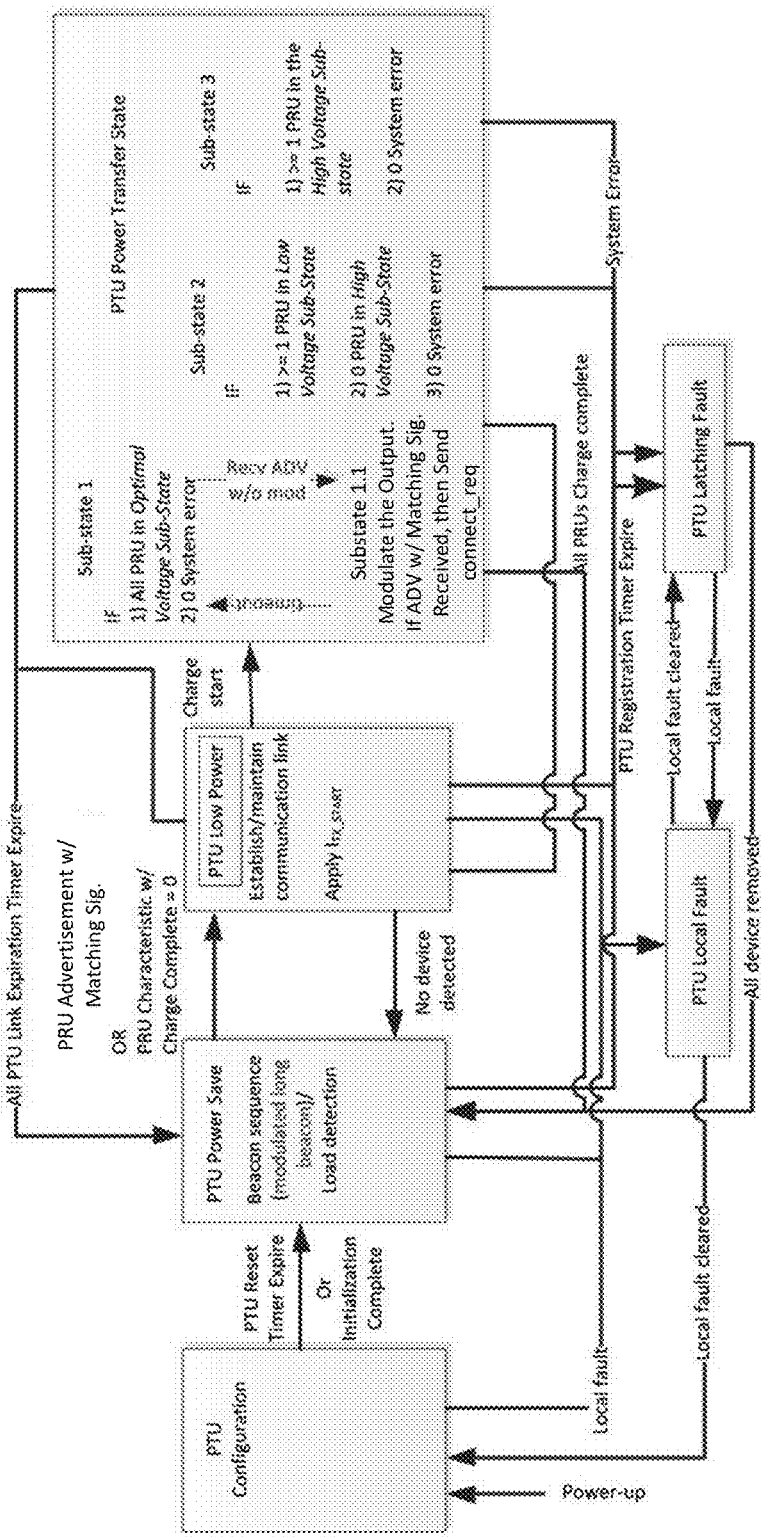
FIG. 5 illustrates an example state diagram.

FIG. 5 illustrates an example state diagram 500. State diagram 500 may be implemented by a PTU such as PTU 210 as described above for system 200 in FIG. 2. Also, other components or elements of system 200 such as PRU 220 may be used to illustrate example interactions with PTU 210. Also, a beacon structure such as beacon structures 300 or 400 as described above for FIGS. 3 and 4 may be utilized to enable PTU 210 to transition to at least some of the states depicted in state diagram 500. However, the example processes or operations are not limited to implementation using elements of system 200 or beacon structures 300/400.

According to some examples, following PTU configuration, PTU 210 may transition to a "power save" state as shown in FIG. 5. For these examples, if beacon structure 300 is utilized, logic and/or features at PTU 210 may first detect PRU 220 based on use of one or more transmitted short beacons. A long beacon may then be sent that includes a modulated signature such as modulated signature 310. If an ADV packet is received from PRU 220 that includes a signature that matches the modulated signature 310, then PTU 210 transitions to a "low power" state. Alternatively, if beacon structure 400 is utilized, logic and/or features at PTU 210 may send a long beacon with a modulated signature such as modulated signature 410 responsive to receiving a first ADV packet from PRU 220 that includes fields indicating support for forward signaling but no signature field. For this alternative, if a second ADV packet is received from PRU 220 that includes a signature field having a signature that matches the modulated signature 410, then PTU 210 transitions to a "low power" state.

In some examples, logic or features at PTU 210 may then establish a communication link with PRU 220 through a low energy wireless communication interface (e.g., BLE link). PTU 210 may then transition to a "power transfer state". For these examples, logic or features at PTU 210 may maintain the communication link while power is transferred to PRU 220.

According to some examples, while in the power transfer state", PTU 210 may be in one of three sub-states that includes sub-state 1, sub-state 2 or sub-state 3. Sub-state 1, for example, has all PRUs (including PRU 220) in an optimal or target voltage sub-state for which the PTU may operate more efficiently. In other words, a voltage sub-state that allows PTU 210 to provide the same voltage levels for wireless power transfer, e.g., all PRUs are for charging a smart phone, tablet or similar device that may have similar voltage requirements for a wireless power transfer. Sub-state 2, for example, has some low voltage devices (e.g., Bluetooth headset) and no high voltage devices (e.g., notebook or laptop computers). Sub-state 3, for example, has multiple high voltage devices.

According to some examples, a sub-state 1.1 may be entered by PTU 210. For these examples, while in sub-state 1, PTU 210 may not be sending long beacons to convey modulated signatures. Rather, responsive to receiving a first ADV packet from a given PRU that that includes fields indicating support for forward signaling but no signature field or has a signature field by the signature does not match a signature previously generated by PTU 210, PTU 210 may modulate the power wirelessly provided to PRU 220 to include a modulated signature such as modulated signature 320 or 420. The given PRU may have logic and/or features to receive this modulated signature, decode the modulated signature, generate a second ADV packet that includes a signature field having a decoded signature matching the modulated signature and send the second ADV packet to PTU 210. PTU 210 may then send a connection request to establish a communication link with the given PRU if the logic and/or features of PTU 210 determine that the decoded signature included in the second ADV packet matches the modulated signature. Power may then be transferred to the given PRU while maintaining this communication link with the given PRU.

Figure 6:
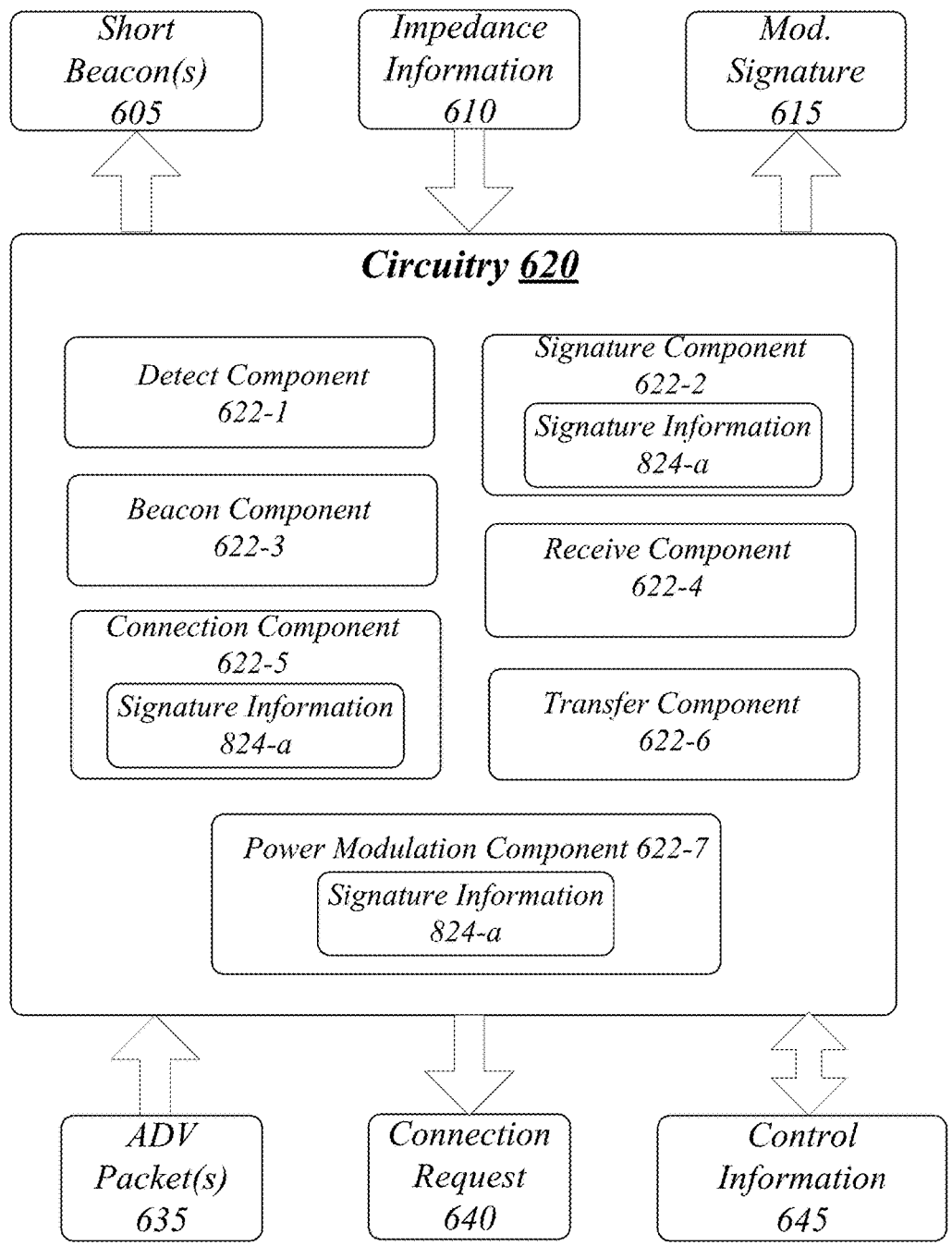
FIG. 6 illustrates an example block diagram for a first apparatus.

FIG. 6 illustrates a block diagram for a first apparatus. As shown in FIG. 6, the first apparatus includes an apparatus 600. Although apparatus 600 shown in FIG. 6 has a limited number of elements in a certain topology or configuration, it may be appreciated that apparatus 600 may include more or less elements in alternate configurations as desired for a given implementation.

The apparatus 600 may include a component of a PTU (e.g., PTU 210) that may be firmware implemented and have a circuitry 620 arranged to execute one or more components 622-a. It is worthy to note that "a" and "b" and "c" and similar designators as used herein are intended to be variables representing any positive integer. Thus, for example, if an implementation sets a value for a=7, then a complete set of components 622-a may include components 622-1, 622-2, 622-3, 622-4, 622-5, 622-6 or 622-7. The examples are not limited in this context.

In some examples, as shown in FIG. 6, apparatus 600 includes circuitry 620. Circuitry 620 may be generally arranged to execute one or more components 622-a. Circuitry 620 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as circuitry 620. According to some examples circuitry 620 may also be an application specific integrated circuit (ASIC) and components 622-a may be implemented as hardware elements of the ASIC.

According to some examples, apparatus 600 may include a detect component 622-1. Detect component 622-1 may be executed by circuitry 620 to detect a PRU based on use of a transmitted short beacon to detect an impedance or charging load associated with the PRU. For these examples, the transmitted short beacon may be included in short beacon(s) 605 and detection may be included in impedance information 610.

In some examples, apparatus 600 may also include a signature component 622-2. Signature component 622-2 may be executed by circuitry 620 to generate a signature. For these examples, the signature may be either randomly generated by signature component 622-2 or generated based on a unique identifier assigned to the PTU including apparatus 600. The signature may be maintained with signature information 624-a, e.g., in a data structure such as a lookup table (LUT).

According to some examples, apparatus 600 may also include a beacon component 622-3. Beacon component 622-3 may be executed by circuitry 620 to transmit a long beacon that includes a modulated signature 615 in the long beacon for the signature generated by signature component 622-2. In some examples, the long beacon including modulated signature 615 may be included in a portion of the long beacon that causes the PRU to energize a low energy wireless communication interface (e.g., BLE interface). In some other examples, the long beacon including mod. signature 615 may be in a second long beacon that is sent after the first long beacon that caused the PRU to energize the low energy wireless communication interface.

In some examples, apparatus 600 may include a receive component 622-4. Receive component 622-4 may be executed by circuitry to receive one or more ADV packet(s) from the first PRU. For these examples, the ADV packet may have been included in ADV packet(s) 635.

According to some examples, apparatus 600 may include a connection component 622-5. Connection component 622-5 may be executed by circuitry 620 to send a connection request to establish a communication link with the PRU through the low energy wireless communication interface if an ADV packet received from the PRU includes a signature that matches the modulated signature. For these examples, the connection request may be included in connection request 640.

In some examples, apparatus 600 may include a transfer component 622-6. Transfer component 622-6 may be executed by circuitry to cause power to be transferred to the PRU while maintaining the communication link. For these examples, control information 645 may include management or control information to facilitate wireless or inductive power transfer to the PRU.

According to some examples, apparatus 600 may include a power modulation component 622-7. Power modulation component 622-7 may be executed by circuitry to modulate power provided to a first PRU responsive to receive component 622-4 receiving an ADV packet from a second PRU that includes fields indicating support for forward signaling but lacks a signature field, e.g. modulated around a provided power of 5 volts. For these examples, mod. signature 615 may be included in the modulated power and the second PRU may be capable of detecting mod. signature 615 included in the modulated power. The second PRU may then send another or second ADV packet that includes a signature that matches mod. signature 615. Receive component 622-4 may receive this second ADV packet and connection component 622-5 may send a connection request to establish a second communication link with the second PRU through a low energy wireless communication interface at the second PRU upon confirming that the second ADV packet includes a signature that matches mod. signature 615. Transfer component 622-6 may then cause power to be transferred to the second PRU while maintaining the second communication link.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 7 illustrates an example of a first logic flow. As shown in FIG. 7, the first logic flow includes a logic flow 700. Logic flow 700 may be representative of some or all of the operations executed by one or more logic, features, or devices described herein, such as apparatus 700. More particularly, logic flow 700 may be implemented by detect component 622-1, signature component 622-2, beacon component 622-3, receive component 622-4, connection component 622-5 or transfer component 622-6.

In the illustrated example shown in FIG. 7, logic flow 700 at block 702 may detect, at a PTU capable of inductively, magnetically or wirelessly transferring power to one or more PRUs, a first PRU based on use of a transmitted short beacon to detect an impedance or charging load associated with the first PRU. For these examples, detect component 622-1 may detect the first PRU.

According to some examples, logic flow 700 at block 704 may transmit a long beacon and including a first modulated signature in the long beacon, the long beacon may cause the first PRU to energize a low energy wireless communication interface. For these examples, beacon component 622-3 may transmit the long beacon that includes a first modulated signature for a signature generated by signature component 622-2.

In some examples, logic flow 700 at block 706 may receive an ADV packet for the first PRU. For these examples, receive component 622-4 may receive the ADV packet.

According to some examples, logic flow 700 at block 708 may send a connection request to establish a first communication link with the first PRU through the low energy wireless communication link when the ADV packet from the first PRU includes a signature that matches the first modulated signature. For these examples, connection component 622-5 may send the connection request.

In some examples, logic flow 700 at block 710 may transfer power to the first PRU while maintaining the first communication link. For these examples, transfer component 622-6 may cause the transfer of power to the first PRU.

FIG. 8 illustrates an example of a second logic flow. As shown in FIG. 8, the second logic flow includes a logic flow 800. Logic flow 800 may be representative of some or all of the operations executed by one or more logic, features, or devices described herein, such as apparatus 800. More particularly, logic flow 800 may be implemented by detect component 622-1, signature component 622-2, beacon component 622-3, receive component 622-4, connection component 622-5 or transfer component 622-6.

In the illustrated example shown in FIG. 8, logic flow 800 at block 802 may detect, at a PTU capable of inductively, magnetically or wirelessly transferring power to one or more PRUs, a first PRU based on use of a transmitted short beacon to detect an impedance or charging load associated with the first PRU. For these examples, detect component 622-1 may detect the first PRU.

According to some examples, logic flow 800 at block 804 may transmit a long beacon to cause the first PRU to energize a low energy wireless communication interface. For these examples, beacon component 622-3 may transmit the long beacon.

In some examples, logic flow 800 at block 806 may receive a first ADV packet from the first PRU that includes fields indicating support for forward signaling and no signature field. For these examples, receive component 622-4 may receive the first ADV packet.

According to some examples, logic flow 800 at block 808 may modulate a remaining portion of the long beacon responsive to receiving the first ADV packet, the remaining portion modulated to include a modulated signature. For these examples, beacon component 622-3 may cause the modulation of the remaining portion of the long beacon.

In some examples, logic flow 800 at block 810 may receive a second ADV packet from the first PRU. For these examples, receive component 622-4 may receive the second ADV packet.

According to some examples, logic flow 800 at block 812 may send a connection request to establish a first communication link with the first PRU through the low energy wireless communication link when the second ADV packet from the first PRU includes a signature that matches the modulated signature included in the remaining portion of the long beacon. For these examples, connection component 622-5 may send the connection request.

In some examples, logic flow 800 at block 812 may transfer power to the first PRU while maintaining the first communication link. For these examples, transfer component 622-6 may cause the transfer of power to the first PRU.

FIG. 9 illustrates an embodiment of a first storage medium. As shown in FIG. 9, the first storage medium includes a storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 700 or 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
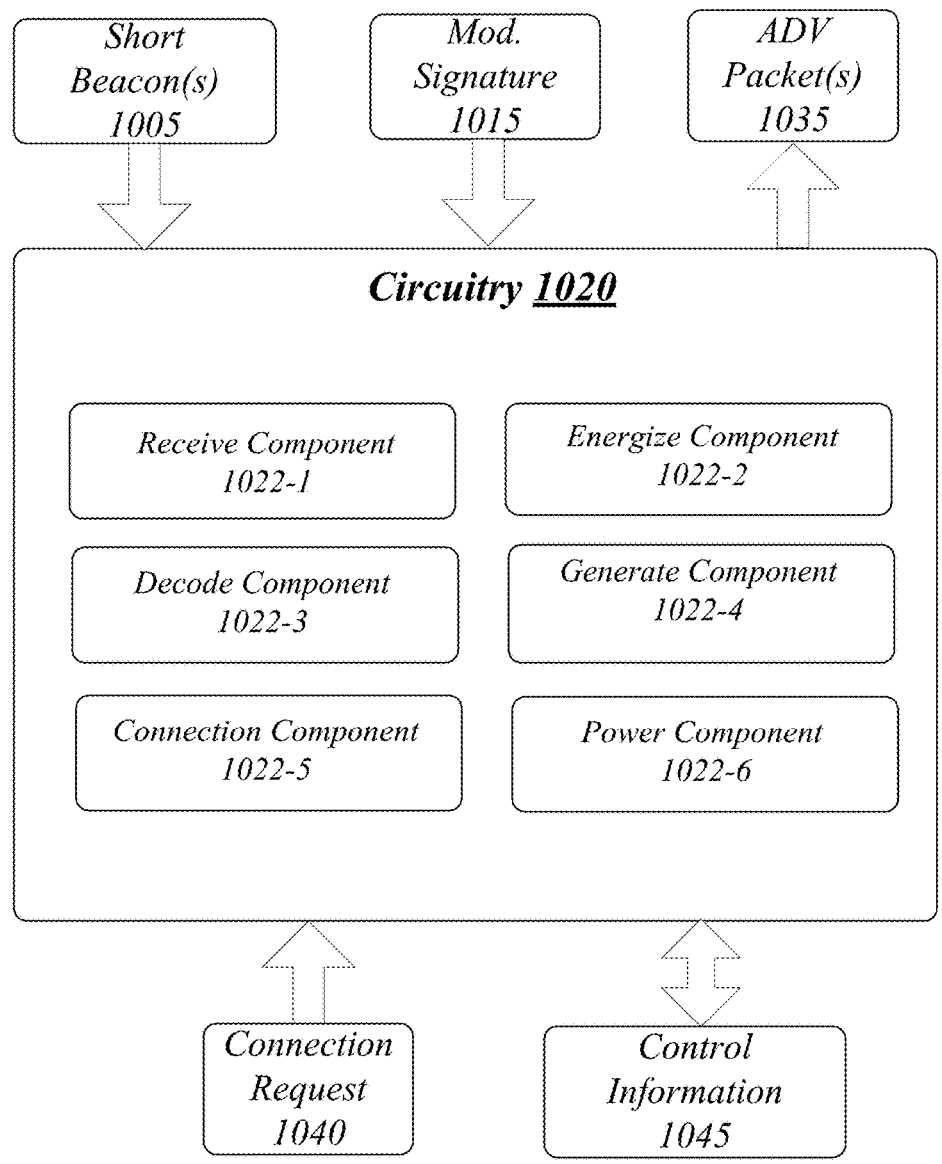
FIG. 10 illustrates an example block diagram for a second apparatus.

FIG. 10 illustrates a block diagram for a second apparatus. As shown in FIG. 10, the second apparatus includes an apparatus 1000. Although apparatus 1000 shown in FIG. 10 has a limited number of elements in a certain topology or configuration, it may be appreciated that apparatus 1000 may include more or less elements in alternate configurations as desired for a given implementation.

The apparatus 1000 may include a component of a PRU (e.g., PRU 210) that may be firmware implemented and have a circuitry 1020 arranged to execute one or more components 1022-a. Similar to apparatus 500 for FIG. 5, "a" and "b" and "c" and similar designators may be variables representing any positive integer. Thus, for example, if an implementation sets a value for a=6, then a complete set of components 1022-a may include components 1022-1, 1022-2, 1022-3, 1022-4, 1022-5 or 1022-6. The examples are not limited in this context.

In some examples, as shown in FIG. 10, apparatus 1000 includes circuitry 1020. Circuitry 1020 may be generally arranged to execute one or more components 1022-a. Circuitry 1020 can be any of various commercially available processors to include, but not limited to, those previously mentioned for circuitry 620 for apparatus 600. Dual microprocessors, multi-core processors, and other multi-processor architectures may also be employed as circuitry 1020. According to some examples circuitry 1020 may also be an application specific integrated circuit (ASIC) and components 1022-a may be implemented as hardware elements of the ASIC.

According to some examples, apparatus 1000 may include a receive component 1022-1. Receive component 1022-1 may be executed by circuitry 1020 to receive a modulated signature. that identifies a PTU capable of inductively, magnetically or wirelessly transferring power to the PRU. In some examples, the modulated signature may be included in mod. signature 1015.

In some examples, apparatus 1000 may also include an energize component 1022-2. Energize component 1022-2 may be executed by circuitry 1020 to energize a low energy wireless communication interface responsive to receiving a long beacon from a PTU.

In some examples, apparatus 1000 may also include a decode component 1022-3. Decode component 1022-3 may be executed by circuitry 1020 to decode a received modulated signature. In some examples, a received modulated signature may have been modulated on an amplitude of the long beacon. In other examples, the modulated signature may have been included in modulated power that was being wirelessly provided to another PRU. For either of these examples, decode component 1022-3 may be capable of decoding the received modulated signature to determine an identity or identifier for the PTU.

According to some examples, apparatus 1000 may also include a generate component 1022-4. Generate component 1022-4 may be executed by circuitry 1020 to generate one or more ADV packets. In some examples, a first or second ADV packet may include the decoded signature. For example, if beacon sequence 300 is being used by the PTU, the first ADV packet may be generated to include the decoded signature. If beacon sequence 400 is used, the second ADV packet may be generated to include the decoded signature. Also, when the second ADV includes the decoded signature, generate component 1022-4 may be capable of causing the first ADV packet (without a decoded signature) to be transmitted to the PTU.

According to some examples, apparatus 1000 may also include a connection component 1022-5. Connection component 1022-5 may be executed by circuitry 1020 to cause the ADV packet including the decoded signature to be transmitted to the PTU to establish a communication link with the PTU through the low energy wireless communication interface. For these examples, the ADV packet may be included in ADV packet(s) 1035 and sent to the PTU.

In some examples, apparatus 1000 may include a power component 1022-6. Power component 1022-6 may be executed by circuitry 1020 to receive or facilitate reception of power from the PTU while connection component maintains the communication link. For these examples, control information 1045 may include management or control information to facilitate reception of power from the PTU via a wireless or inductive power transfer.

Included herein is a set of component flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 11 illustrates an example of a third logic flow. As shown in FIG. 11, the third logic flow includes a logic flow 1100. Logic flow 1100 may be representative of some or all of the operations executed by one or more logic, features, or devices described herein, such as apparatus 1100. More particularly, logic flow 1100 may be implemented by receive component 1022-1, energize component 1022-2, decode component 1022-3, generate component 1022-4, connection component 1022-5 or power component 1022-6.

In the illustrated example shown in FIG. 11, logic flow 1100 at block 1102 may receive, at a PRU, a long beacon including a modulated signature that identifies a PTU capable of inductively, magnetically or wirelessly transferring power to the PRU. For these examples, receive component 1022-1 may receive the long beacon.

In some examples, logic flow 1100 at block 1104 may energize a low energy wireless communication interface responsive to receiving the long beacon. For these examples, energize component 1022-2 may energize the interface (e.g., a BLE interface).

According to some examples, logic flow 1100 at block 1106 may decode the modulated signature. For these examples, decode component 1022-3 may decode the modulated signature.

In some examples, logic flow 1100 at block 1108 may generate an ADV packet that includes the decoded signature. For these examples, generate component 1022-4 may generate the ADV packet.

According to some examples, logic flow 1100 at block 1110 may transmit the ADV packet to the PTU to establish a communication link with the PTU through the low energy wireless communication interface. For these examples, connection component 1022-5 may cause the ADV packet to be transmitted. Connection component 1022-5 may also interact with the PTU to establish the communication link.

In some examples, logic flow 1100 at block 1112 may receive power from the PTU while maintaining the communication link. For these examples, power component 1022-6 may facilitate the receiving of power from the PTU while connection component 1022-5 maintains the communication link.

FIG. 12 illustrates an example of a fourth logic flow. As shown in FIG. 12, the fourth logic flow includes a logic flow 1200. Logic flow 1200 may be representative of some or all of the operations executed by one or more logic, features, or devices described herein, such as apparatus 1200. More particularly, logic flow 1200 may be implemented by receive component 1022-1, energize component 1022-2, decode component 1022-3, generate component 1022-4, connection component 1022-5 or power component 1022-6.

In the illustrated example shown in FIG. 12, logic flow 1200 at block 1202 may receive, at a PRU, a long beacon from a PTU capable of inductively, magnetically or wirelessly transferring power to the PRU. For these examples, receive component 1022-1 may receive the long beacon.

In some examples, logic flow 1200 at block 1204 may energize a low energy wireless communication interface responsive to receiving the long beacon. For these examples, energize component 1022-2 may energize the interface (e.g., a BLE interface).

According to some examples, logic flow 1200 at block 1206 may generate a first ADV packet including fields indicating support for forward signaling and no signature field. For these examples, generate component 1022-4 may generate the first ADV packet.

In some examples, logic flow 1200 at block 1208 may transmit the first ADV packet to the PTU and the PTU capable of modulating a remaining portion of the long beacon to include a modulated signature responsive to receiving the first ADV. For these examples, generate component 1022-4 may be capable of causing the first ADV packet to be transmitted to the PTU.

According to some examples, logic flow 1200 at block 1208 may decode the modulated signature included in the remaining portion of the long beacon. For these examples, decode component 1022-3 may decode the modulated signature.

In some examples, logic flow 1200 at block 1210 may generate a second ADV packet that includes the decoded signature. For these examples, generate component 1022-4 may generate the second ADV packet.

According to some examples, logic flow 1200 at block 1214 may transmit the second ADV packet to the PTU to establish a communication link with the PTU through the low energy wireless communication interface. For these examples, connection component 1022-5 may cause the second ADV packet to be transmitted. Connection component 1022-5 may also interact with the PTU to establish the communication link.

In some examples, logic flow 1200 at block 1216 may receive power from the PTU while maintaining the communication link. For these examples, power component 1022-6 may facilitate the receiving of power from the PTU while connection component 1022-5 maintains the communication link.

FIG. 13 illustrates an embodiment of a second storage medium. As shown in FIG. 13, the second storage medium includes a storage medium 1300. Storage medium 1300 may comprise an article of manufacture. In some examples, storage medium 1300 may include any non-transitory computer readable medium or machine readable medium, such as an optical, magnetic or semiconductor storage. Storage medium 1300 may store various types of computer executable instructions, such as instructions to implement logic flows 1100 or 1200. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 14:
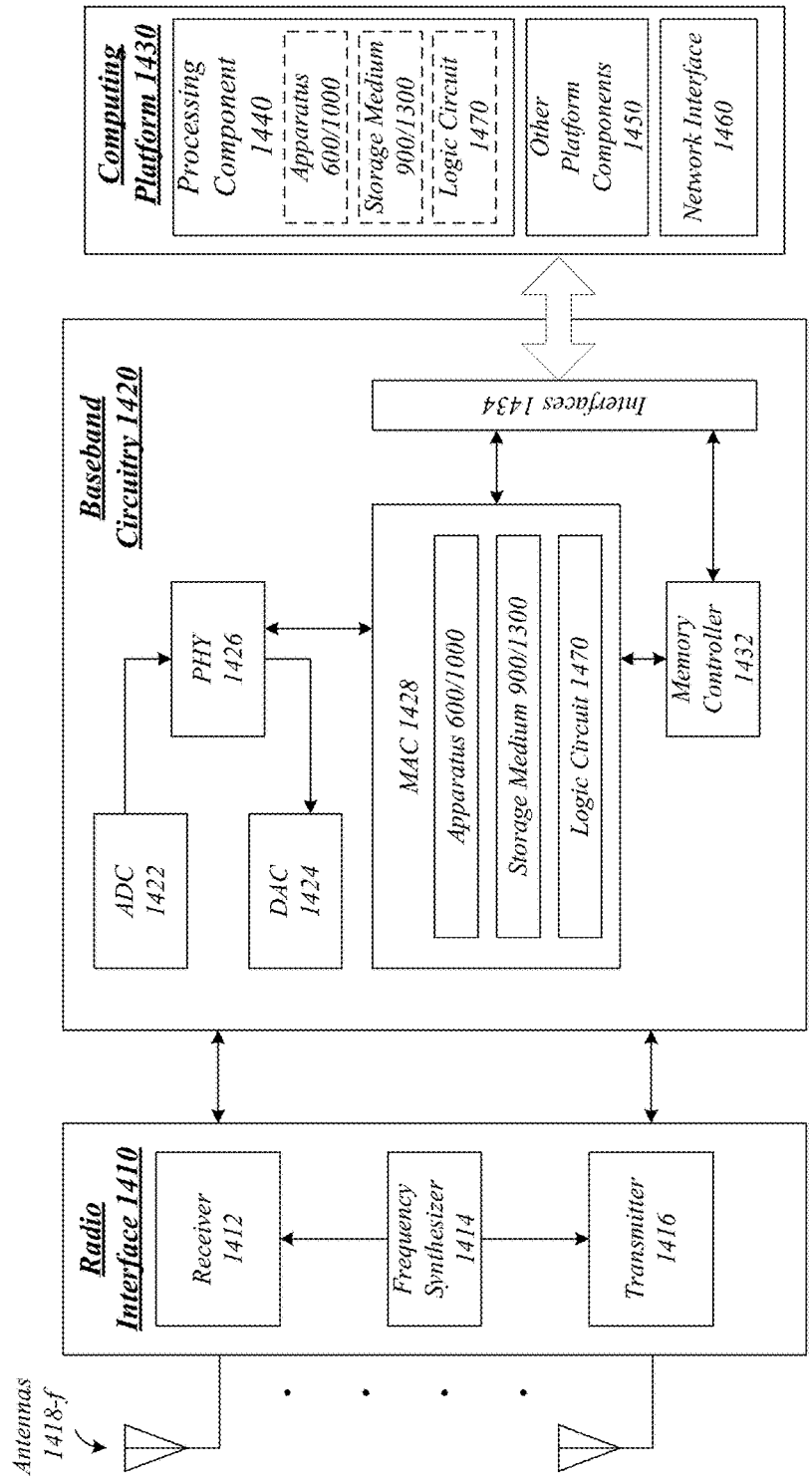
FIG. 14 illustrates an example of a device.

FIG. 14 illustrates an embodiment of a device 1400. In some examples, device 1400 may be configured or arranged for either providing power or receiving power via wireless or inductive power transfer. Device 1400 may implement, for example, apparatus 600/1000, storage medium 900/1300 and/or a logic circuit 1470. The logic circuit 1470 may include physical circuits to perform operations described for apparatus 600/1000. As shown in FIG. 14, device 1400 may include a radio interface 1410, baseband circuitry 1420, and computing platform 1430, although examples are not limited to this configuration.

The device 1400 may implement some or all of the structure and/or operations for apparatus 600/1000, storage medium 900/1300 and/or logic circuit 1470 in a single computing entity, such as entirely within a single device. The embodiments are not limited in this context.

Radio interface 1410 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 1410 may include, for example, a receiver 1412, a transmitter 1416 and/or a frequency synthesizer 1414. Radio interface 1410 may include bias controls, a crystal oscillator and/or one or more antennas 1418-*f*. In another embodiment, radio interface 1410 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1420 may communicate with radio interface 1410 to process receive and/or transmit signals and may include, for example, an analog-to-digital converter 1422 for down converting received signals, a digital-to-analog converter 1424 for up converting signals for transmission. Further, baseband circuitry 1420 may include a baseband or physical layer (PHY) processing circuit 1426 for PHY link layer processing of respective receive/transmit signals. Baseband circuitry 1420 may include, for example, a processing circuit 1428 for medium access control (MAC)/data link layer processing. Baseband circuitry 1420 may include a memory controller 1432 for communicating with MAC processing circuit 1428 and/or a computing platform 1430, for example, via one or more interfaces 1434.

In some embodiments, PHY processing circuit 1426 may include a frame construction and/or detection component, in combination with additional circuitry such as a buffer memory, to construct and/or deconstruct communication frames (e.g., containing subframes). Alternatively or in addition, MAC processing circuit 1428 may share processing for certain of these functions or perform these processes independent of PHY processing circuit 1426. In some embodiments, MAC and PHY processing may be integrated into a single circuit.

Computing platform 1430 may provide computing functionality for device 1400. As shown, computing platform 1430 may include a processing component 1440. In addition to, or alternatively of, baseband circuitry 1420 of device 1400 may execute processing operations or logic for apparatus 600/1000, storage medium 900/1300, and logic circuit 1470 using the processing component 1430. Processing component 1440 (and/or PHY 1426 and/or MAC 1428) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1430 may further include other platform components 1450. Other platform components 1450 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1430 may further include a network interface 1460. In some examples, network interface 1460 may include logic and/or features to support network interfaces operated in compliance with one or more wireless or wired technologies such as those described above for establishing a communication link through a low power wireless communication interface.

Device 1400 may include a PTU or a PRU and may be, for example, user equipment, a computer, a personal computer (PC), a desktop computer, a laptop computer, a notebook computer, a netbook computer, a tablet computer, an ultra-book computer, a smart phone, a wearable computing device, embedded electronics, a gaming console or a portable game device. Accordingly, functions and/or specific configurations of device 1400 described herein, may be included or omitted in various embodiments of device 1400, as suitably desired.

Embodiments of device 1400 may be implemented using single input single output (SISO) architectures. However, certain implementations may include multiple antennas (e.g., antennas 1418-*f*) for transmission and/or reception using adaptive antenna techniques for beamforming or spatial division multiple access (SDMA) and/or using multiple input multiple output (MIMO) communication techniques.

The components and features of device 1400 may be implemented using any combination of discrete circuitry, application specific integrated circuits (ASICs), logic gates and/or single chip architectures. Further, the features of device 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus may include circuitry for a PTU capable of inductively, magnetically or wirelessly transferring power to one or more PRUs. The apparatus may also include a detect component for execution by the circuitry to detect a first PRU based on use of a transmitted short beacon to detect an impedance or charging load associated with the first PRU. The apparatus may also include a beacon component for execution by the circuitry to transmit a long beacon that includes a first modulated signature. The long beacon may cause the first PRU to energize a low energy wireless communication interface. The apparatus may also include a receive component for execution by the circuitry to receive an ADV packet from the first PRU. The apparatus may also include a connection component for execution by the circuitry to send a first connection request to the first PRU to establish a first communication link with the first PRU through the low energy wireless communication interface when the ADV packet from the first PRU includes a signature that matches the first modulated signature. The apparatus may also include a transfer component for execution by the circuitry to cause transfer of power to the first PRU while maintaining the first communication link.

Example 2

The apparatus of example 1, the receive component to receive a first ADV packet from a second PRU while power is being transferred to the first PRU. The first ADV packet may include fields indicating support for forward signaling and no signature matching the first modulated signature. The apparatus of example 1 may also include a power modulation component for execution by the circuitry to modulate power provided to the first PRU responsive to the receive component receiving the first ADV packet. For these examples, the power modulated to generate a second modulated signature that is capable of being detected by the second PRU. The receive component may then receive a second ADV packet from the second PRU and the connection component may send a second connection request to the second PRU to establish a second communication link with the second PRU through a low energy wireless communication interface at the second PRU when the second ADV packet includes a signature that matches the second modulated signature. Also, for these examples, the transfer component may cause transfer of power to the second PRU while maintaining the second communication link.

Example 3

The apparatus of example 2, the first and second modulation signatures, when decoded, may result in a same signature.

Example 4

The apparatus of example 1, the first modulated signature may include a sequence modulated on an amplitude of the long beacon. The sequence may indicate an identifier for the PTU.

Example 5

The apparatus of example 1 may also include a transmit resonator arrange to transfer power to the first PRU via resonate coupling with the first PRU.

Example 6

The apparatus of example 5, resonate coupling with the first PRU may be at an operating frequency in the ISM radio band that includes 6.78 MHz.

Example 7

The apparatus of example 1, the PTU may be arranged to operate in compliance with one or more industry standards including Alliance for Wireless Power (A4WP), Version 1.0 Baseline System Specification or the Bluetooth Specification, Version 4.1.

Example 8

The apparatus of example 7, the short and long beacons may include A4WP beacons and the low energy wireless communication interface may be a BLE interface.

Example 9

An example method may include detecting, at a PTU capable of inductively, magnetically or wirelessly transferring power to one or more PRUs, a first PRU based on use of a transmitted short beacon to detect an impedance or charging load associated with the first PRU. The method may also include transmitting a long beacon and including a first modulated signature in the long beacon. The long beacon may cause the first PRU to energize a low energy wireless communication interface. The method may also include receiving an ADV packet from the first PRU. The method may also include sending a connection request to establish a first communication link with the first PRU through the low energy wireless communication interface when the ADV packet from the first PRU includes a signature that matches the first modulated signature. The method may also include transferring power to the first PRU while maintaining the communication link.

Example 10

The method of example 9 may also include receiving a first ADV packet from a second PRU while power is being transferred to the first PRU. The first ADV packet may include fields indicating support for forward signaling and no signature matching the first modulated signature. The method may also include modulating power provided to the first PRU responsive to receiving the first ADV packet. The power may be modulated to generate a second modulated signature that may be capable of being detected by the second PRU. The method may also include receiving a second ADV packet from the second PRU and sending a second connection request to the second PRU to establish a second communication link with the second PRU through a low energy wireless communication interface at the second PRU when the second ADV packet includes a signature that matches the second modulated signature. The method may also include transferring power to the second PRU while maintaining the second communication link.

Example 11

The method of example 10, the first and second modulation signatures, when decoded, may result in a different signature.

Example 12

The method of example 9, the first modulated signature may include a sequence modulated on an amplitude of the long beacon, the sequence to indicate an identifier for the PTU.

Example 13

The method of example 9, the PTU may inductively, magnetically or wirelessly transfer power to the first PRU via resonate coupling with the first PRU at an operating frequency in the ISM radio band that includes 6.78 MHz.

Example 14

The method of example 9, the PTU may be arranged to operate in compliance with one or more industry standards including Alliance for Wireless Power (A4WP), Version 1.0 Baseline System Specification or the Bluetooth Specification, Version 4.1.

Example 15

The method of example 14, the short and long beacons may include A4WP beacons and the low energy wireless communication interface may be a BLE interface.

Example 16

An example at least one machine readable medium may include a plurality of instructions that in response to being executed on a system at a PTU may cause the system to carry out a method according to any one of examples 9 to 15.

Example 17

An example apparatus may include means for performing the methods of any one of examples 9 to 15.

Example 18

An example at least one machine readable medium may include a plurality of instructions that in response to being executed by circuitry for a PTU capable of inductively, magnetically or wirelessly transferring power to one or more PRUs may cause the circuitry to detect a first PRU based on use of a transmitted short beacon to detect an impedance or charging load associated with the first PRU. The instructions may also cause the circuitry to transmit a long beacon and including a first modulated signature. The long beacon to cause the first PRU to energize a low energy wireless communication interface. The instructions may also cause the circuitry to receive an ADV packet from the first PRU and send a connection request to establish a first communication link with the first PRU through the low energy wireless communication interface when the ADV packet from the first PRU includes a signature that matches the first modulated signature. The instructions may also cause the circuitry to transfer power to the first PRU while maintaining the first communication link.

Example 19

The at least one machine readable medium of example 16, the instructions to also cause the circuitry to receive a first ADV packet from a second PRU while power is being transferred to the first PRU. The first ADV packet may include fields indicating support for forward signaling and no signature matching the first modulated signature. The instructions may also cause the circuitry to modulate power provided to the first PRU responsive to receiving the first ADV packet. The power may be modulated to generate a second modulated signature that may be capable of being detected by the second PRU. The instructions may also cause the circuitry to receive a second ADV packet from the second PRU and send a second connection request to the second PRU to establish a second communication link with the second PRU through a low energy wireless communication interface at the second PRU when the second ADV packet includes a signature that matches the second modulated signature. The instructions may also cause the circuitry to transfer power to the second PRU while maintaining the second communication link.

Example 20

The at least one machine readable medium of example 19, the first and second modulation signatures, when decoded, may result in a same signature.

Example 21

The at least one machine readable medium of example 18, the first modulated signature may include a sequence modulated on an amplitude of the long beacon, the sequence to indicate an identifier for the PTU.

Example 22

The at least one machine readable medium of example 18, the PTU may inductively, magnetically or wirelessly transfer power to the first PRU via resonate coupling with the first PRU at an operating frequency in the ISM radio band that includes 6.78 MHz.

Example 23

The at least one machine readable medium of example 18, the PTU may be arranged to operate in compliance with one or more industry standards including Alliance for Wireless Power (A4WP), Version 1.0 Baseline System Specification or the Bluetooth Specification, Version 4.1.

Example 24

The at least one machine readable medium of example 23, the short and long beacons may include A4WP beacons and the low energy wireless communication interface may be a BLE interface.

Example 25

An example apparatus for a PTU capable of inductively, magnetically or wirelessly transferring power to one or more PRUs may include means for detecting a first PRU based on use of a transmitted short beacon to detect an impedance or charging load associated with the first PRU. The apparatus may also include means for transmitting a long beacon and including a first modulated. The long beacon may cause the first PRU to energize a low energy wireless communication interface. The apparatus may also include means for receiving an ADV packet from the first PRU. The apparatus may also include means for sending a connection request to establish a first communication link with the first PRU through the low energy wireless communication interface when the ADV packet from the first PRU includes a signature that matches the first modulated signature. The apparatus may also include means for transferring power to the first PRU while maintaining the communication link.

Example 26

The apparatus of example 25 may also include means for receiving a first ADV packet from a second PRU while power is being transferred to the first PRU. The first ADV packet also including fields indicating support for forward signaling and no signature matching the first modulated signature. The apparatus may also include means for modulating power provided to the first PRU responsive to receiving the first ADV packet. The power modulated to generate a second modulated signature that is capable of being detected by the second PRU. The apparatus may also include means for receiving a second ADV packet from the second PRU. The apparatus may also include means for sending a second connection request to the second PRU to establish a second communication link with the second PRU through a low energy wireless communication interface at the second PRU when the second ADV packet includes a signature that matches the second modulated signature. The apparatus may also include means for transferring power to the second PRU while maintaining the second communication link.

Example 27

An example apparatus may include circuitry for a PTU capable of inductively, magnetically or wirelessly transferring power to one or more PRUs. The apparatus may also include a detect component for execution by the circuitry to detect a first PRU based on use of a transmitted short beacon to detect an impedance or charging load associated with the first PRU. The apparatus may also include a beacon component for execution by the circuitry to transmit a long beacon to cause the first PRU to energize a low energy wireless communication interface. The apparatus may also include a receive component for execution by the circuitry to receive a first ADV packet from the first PRU including fields indicating support for forward signaling and no signature field. The beacon component may a remaining portion of the long beacon responsive to the receive component receiving the first ADV packet. The remaining portion of the long beacon may be modulated to include a modulated signature. The receive component may receive a second ADV packet from the first PRU. The apparatus may also include a connection component for execution by the circuitry to send a connection request to establish a first communication link with the first PRU through the low energy wireless communication interface when the second ADV packet includes a signature that matches the modulated signature included in the remaining portion of the long beacon. The apparatus may also include a transfer component for execution by the circuitry to cause transfer of power to the first PRU while maintaining the first communication link.

Example 28

The apparatus of example 27, the receive component may receive a first ADV packet from a second PRU while power is being transferred to the first PRU. The first ADV packet from the second PRU may include fields indicating support for forward signaling and no signature matching the first modulated signature. The apparatus may also include a power modulation component for execution by the circuitry to modulate power provided to the first PRU responsive to the receive component receiving the first ADV packet from the second PRU, the power modulated to generate a second modulated signature that is capable of being detected by the second PRU. The receive component to may receive a second ADV packet from the second PRU. The connection component may send a second connection request to the second PRU to establish a second communication link with the second PRU through a low energy wireless communication interface at the second PRU when the second ADV packet from the second PRU includes a signature that matches the second modulated signature. The transfer component may cause transfer of power to the second PRU while maintaining the second communication link.

Example 29

The apparatus of example 28, the first and second modulation signatures, when decoded, may result in a different signature.

Example 30

The apparatus of example 27, the first modulated signature may include a sequence modulated on an amplitude of the remaining portion of the long beacon, the sequence to indicate an identifier for the PTU.

Example 31

The apparatus of example 27, a transmit resonator may be arranged to transfer power to the first PRU via resonate coupling with the first PRU.

Example 32

The apparatus of example 31, resonate coupling with the first PRU may be at an operating frequency in the ISM radio band that includes 6.78 MHz.

Example 33

The apparatus of example 27, the PTU may be arranged to operate in compliance with one or more industry standards including Alliance for Wireless Power (A4WP), Version 1.0 Baseline System Specification or the Bluetooth Specification, Version 4.1.

Example 34

The apparatus of example 33, the short and long beacons may include A4WP beacons and the low energy wireless communication interface may be a BLE interface.

Example 35

An example method may include detecting, at a PTU capable of inductively, magnetically or wirelessly transferring power to one or more PRUs, a first PRU based on use of a transmitted short beacon to detect an impedance or charging load associated with the first PRU. The method may also include transmitting a long beacon to cause the first PRU to energize a low energy wireless communication interface. The methods may also include receiving a first ADV packet from the first PRU including fields indicating support for forward signaling and no signature field. The method may also include modulating a remaining portion of the long beacon responsive to receiving the first ADV packet from the first PRU, the remaining portion of the long beacon may include a modulated signature. The method may also include receiving a second ADV packet from the first PRU. The method may also include sending a connection request to establish a first communication link with the first PRU through the low energy wireless communication interface when the second ADV packet from the first PRU includes a signature that matches the modulated signature included in the remaining portion of the long beacon. The method may also include transferring of power to the first PRU while maintaining the first communication link.

Example 36

The method of example 35 may also include receiving a first ADV packet from a second PRU while power is being transferred to the first PRU. The first ADV packet from the second PRU may include fields indicating support for forward signaling and no signature matching the first modulated signature. The method may also include modulating power provided to the first PRU responsive to receiving the first ADV packet from the second PRU, the power modulated to generate a second modulated signature that is capable of being detected by the second PRU. The method may also include receiving a second ADV packet from the second PRU. The method may also include sending a second connection request to the second PRU to establish a second communication link with the second PRU through a low energy wireless communication interface at the second PRU when the second ADV packet from the second PRU includes a signature that matches the second modulated signature. The method may also include transferring power to the second PRU while maintaining the second communication link.

Example 37

The method of example 36, the first and second modulation signatures, when decoded, may result in a different signature.

Example 38

The method of example 35, the first modulated signature may include a sequence modulated on an amplitude of the remaining portion of the long beacon. The sequence may indicate an identifier for the PTU.

Example 39

The method of example 35, the PTU may inductively, magnetically or wirelessly transfer power to the first PRU via resonate coupling with the first PRU at an operating frequency in the ISM radio band that includes 6.78 MHz.

Example 40

The method of example 35, the PTU may be arranged to operate in compliance with one or more industry standards including Alliance for Wireless Power (A4WP), Version 1.0 Baseline System Specification or the Bluetooth Specification, Version 4.1.

Example 41

The method of example 40, the short and long beacons may include A4WP beacons and the low energy wireless communication interface may be a BLE interface.

Example 42

An example at least one machine readable medium may include a plurality of instructions that in response to being executed on a system at a PTU may cause the system to carry out a method according to any one of examples 35 to 41.

Example 43

An example apparatus may include means for performing the methods of any one of examples 35 to 41.

Example 44

An example at least one machine readable medium may include a plurality of instructions that in response to being executed by circuitry for a PTU capable of inductively, magnetically or wirelessly transferring power to one or more PRUs may cause the circuitry to transmit a long beacon to cause the first PRU to energize a low energy wireless communication interface. The instructions may also cause the circuitry to receive a first ADV packet from the first PRU including fields indicating support for forward signaling and no signature field. The instructions may also cause the circuitry to module a remaining portion of the long beacon responsive to receiving the first ADV packet from the first PRU. The remaining portion of the long beacon may be modulated to include a modulated signature. The instructions may also cause the circuitry to receive a second ADV packet from the first PRU. The instructions may also cause the circuitry to send a connection request to establish a first communication link with the first PRU through the low energy wireless communication interface when the second ADV packet from the first PRU includes a signature that matches the modulated signature included in the remaining portion of the long beacon. The instructions may also cause the circuitry to transfer of power to the first PRU while maintaining the first communication link.

Example 45

The at least one machine readable medium of example 44, the instructions may also cause the circuitry to receive a first ADV packet from a second PRU while power is being transferred to the first PRU. The first ADV packet from the second PRU may include fields indicating support for forward signaling and no signature matching the first modulated signature. The instructions may also cause the circuitry to modulate power provided to the first PRU responsive to receiving the first ADV packet from the first PRU. The power modulated to generate a second modulated signature that is capable of being detected by the second PRU. The instructions may also cause the circuitry to receive a second ADV packet from the second PRU. The instructions may also cause the circuitry to send a second connection request to the second PRU to establish a second communication link with the second PRU through a low energy wireless communication interface at the second PRU when the second ADV packet from the second PRU includes a signature that matches the second modulated signature. The instructions may also cause the circuitry to transfer power to the second PRU while maintaining the second communication link.

Example 46

The at least one machine readable medium of example 45, the first and second modulation signatures, when decoded, may result in a different signature.

Example 47

The at least one machine readable medium of example 46, the first modulated signature may include a sequence modulated on an amplitude of the remaining portion of the long beacon, the sequence to indicate an identifier for the PTU.

Example 48

The at least one machine readable medium of example 44, the PTU may inductively, magnetically or wirelessly transfer power to the first PRU via resonate coupling with the first PRU at an operating frequency in the ISM radio band that includes 6.78 MHz.

Example 49

The at least one machine readable medium of example 44, the PTU may be arranged to operate in compliance with one or more industry standards including Alliance for Wireless Power (A4WP), Version 1.0 Baseline System Specification or the Bluetooth Specification, Version 4.1.

Example 50

The at least one machine readable medium of example 49, the short and long beacons may include an A4WP beacons and the low energy wireless communication interface may be a BLE interface.

Example 51

An example apparatus for a PTU capable of inductively, magnetically or wirelessly transferring power to one or more PRUs may include means for detecting a first PRU based on use of a transmitted short beacon to detect an impedance or charging load associated with the first PRU including fields indicating support for forward signaling and no signature field. The apparatus may also include means for transmitting a long beacon to cause the first PRU to energize a low energy wireless communication interface. The apparatus may also include means for receiving a first ADV packet from the first PRU including fields indicating support for forward signaling and no signature field. The apparatus may also include means for modulating a remaining portion of the long beacon responsive to receiving the first ADV packet from the first PRU. The remaining portion of the long beacon may be modulated to include a modulated signature. The apparatus may also include means for receiving a second ADV packet from the first PRU. The apparatus may also include means for sending a connection request to establish a first communication link with the first PRU through the low energy wireless communication interface when the second ADV packet includes a signature that matches the modulated signature included in the remaining portion of the long beacon. The apparatus may also include means for transferring of power to the first PRU while maintaining the first communication link.

Example 52

The apparatus of example 51 may also include means for receiving a first ADV packet from a second PRU while power is being transferred to the first PRU. The first ADV packet from the second PRU may include fields indicating support for forward signaling and no signature matching the first modulated signature. The apparatus may also include means for modulating power provided to the first PRU responsive to receiving the first ADV packet from the second PRU. The power may be modulated to generate a second modulated signature that is capable of being detected by the second PRU. The apparatus may also include means for receiving a second ADV packet from the second PRU. The apparatus may also include means for sending a second connection request to the second PRU to establish a second communication link with the second PRU through a low energy wireless communication interface at the second PRU when the second ADV packet from the second PRU includes a signature that matches the second modulated signature. The apparatus may also include means for transferring power to the second PRU while maintaining the second communication link.

Example 53

An example apparatus may include circuitry for a power receive unit (PRU). The apparatus may also include a receive component for execution by the circuitry to receive a long beacon including a modulated signature that identifies a PTU capable of inductively, magnetically or wirelessly transferring power to the PRU. The apparatus may also include an energize component for execution by the circuitry to energize a low energy wireless communication interface responsive to receiving the long beacon. The apparatus may also include a decode component for execution by the circuitry to decode the modulated signature. The apparatus may also include a generate component for execution by the circuitry to generate an ADV packet that includes the decoded signature. The apparatus may also include a connection component for execution by the circuitry to transmit the ADV packet to the PTU to establish a communication link with the PTU through the low energy wireless communication interface. The apparatus may also include a power component for execution by the circuitry to receive or facilitate reception of power from the PTU while the connection component maintains the communication link.

Example 54

The apparatus of example 53 may also include a receive resonator arranged to receive power from the PTU via resonate coupling with the PTU.

Example 55

The apparatus of example 54, resonate coupling with the PTU may be at an operating frequency in the ISM radio band that includes 6.78 MHz.

Example 56

The apparatus of example 53, the PRU may be arranged to operate in compliance with one or more industry standards including Alliance for Wireless Power (A4WP), Version 1.0 Baseline System Specification or the Bluetooth Specification, Version 4.1.

Example 57

The apparatus of example 56, the long beacon may include an A4WP beacon and the low energy wireless communication interface may be a BLE interface.

Example 58

The apparatus of example 53, the PTU may include a laptop computer, a notebook computer, a netbook computer, a tablet computer, a smart phone, a wearable computing device or a portable game device.

Example 59

An example method may include receiving, at a power receive unit (PRU), a long beacon including a modulated signature that identifies a PTU capable of inductively, magnetically or wirelessly transferring power to the PRU. The method may also include energizing a low energy wireless communication interface responsive to receiving the long beacon. The method may also include decoding the modulated signature. The method may also include generating an ADV packet that includes the decoded signature. The method may also include transmitting the ADV packet to the PTU to establish a communication link with the PTU through the low energy wireless communication interface. The method may also include receiving power from the PTU while maintaining the communication link.

Example 60

The method of example 59, the PTU may be capable of inductively, magnetically or wirelessly transferring power to the PRU via resonate coupling at an operating frequency in the ISM radio band that includes 6.78 MHz.

Example 61

The method of example 59, the PRU may be arranged to operate in compliance with one or more industry standards including Alliance for Wireless Power (A4WP), Version 1.0 Baseline System Specification or the Bluetooth Specification, Version 4.1.

Example 62

The method of example 61, the long beacon may include an A4WP beacon and the low energy wireless communication interface may be a BLE interface.

Example 63

The method of example 59, the PTU may include a laptop computer, a notebook computer, a netbook computer, a tablet computer, a smart phone, a wearable computing device or a portable game device.

Example 64

An example at least one machine readable medium may include a plurality of instructions that in response to being executed on a system at a power receive unit (PRU) cause the system to carry out a method according to any one of examples 59 to 63.

Example 65

An example apparatus comprising means for performing the methods of any one of examples 59 to 63.

Example 66

An example at least one machine readable medium may include a plurality of instructions that in response to being executed by circuitry for a power receive unit (PRU) causes the circuitry to receive a long beacon including a modulated signature that identifies a PTU capable of inductively, magnetically or wirelessly transferring power to the PRU. The instructions may also cause the circuitry to energize a low energy wireless communication interface responsive to receiving the long beacon. The instructions may also cause the circuitry to decode the modulated signature. The instructions may also cause the circuitry to generate an ADV packet that includes the decoded signature. The instructions may also cause the circuitry to transmit the ADV packet to the PTU to establish a communication link with the PTU through the low energy wireless communication interface. The instructions may also cause the circuitry to receive power from the PTU while maintaining the communication link.

Example 67

The at least one machine readable medium of example 66, the PTU may be capable of inductively, magnetically or wirelessly transferring power to the PRU via resonate coupling at an operating frequency in the ISM radio band that includes 6.78 MHz.

Example 68

The at least one machine readable medium of example 66, the PRU may be arranged to operate in compliance with one or more industry standards including Alliance for Wireless Power (A4WP), Version 1.0 Baseline System Specification or the Bluetooth Specification, Version 4.1.

Example 69

The at least one machine readable medium of example 68, the long beacon may include an A4WP beacon and the low energy wireless communication interface may be a BLE interface.

Example 70

The at least one machine readable medium of example 66, the PTU may include a laptop computer, a notebook computer, a netbook computer, a tablet computer, a smart phone, a wearable computing device or a portable game device.

Example 71

An example apparatus for a power receive unit (PRU) may include means for receiving a long beacon including a modulated signature that identifies a PTU capable of inductively, magnetically or wirelessly transferring power to the PRU. The example apparatus may also include means for energizing a low energy wireless communication interface responsive to receiving the long beacon. The example apparatus may also include means for decoding the modulated signature. The example apparatus may also include means for generating an ADV packet that includes the decoded signature. The example apparatus may also include means for transmitting the ADV packet to the PTU to establish a communication link with the PTU through the low energy wireless communication interface. The example apparatus may also include receiving power from the PTU while maintaining the communication link.

Example 72

An example apparatus may include circuitry for a power receive unit (PRU). The example apparatus may also include a receive component for execution by the circuitry to receive a long beacon from a PTU capable of inductively, magnetically or wirelessly transferring power to the PRU. The example apparatus may also include an energize component for execution by the circuitry to energize a low energy wireless communication interface responsive to receiving the long beacon. The example apparatus may also include a generate component for execution by the circuitry to generate a first ADV packet and cause the first ADV packet to be transmitted to the PTU. The first ADV packet may include fields indicating support for forward signaling and no signature field. The PTU may be capable of modulating a remaining portion of the long beacon to include a modulated signature responsive to receiving the first ADV packet. The example apparatus may also include a decode component for execution by the circuitry to decode a modulated signature included in the remaining portion of the long beacon received by the receive component from the PTU, the generate component to generate a second ADV packet that includes the decoded signature. The example apparatus may also include a connection component for execution by the circuitry to cause the second ADV packet to be transmitted to the PTU to establish a communication link with the PTU through the low energy wireless communication interface. The example apparatus may also include a power component for execution by the circuitry to receive or facilitate reception of power from the PTU while the connection component maintains the communication link.

Example 73

The apparatus of example 72, comprising a receive resonator arranged to receive power from the PTU via resonate coupling with the PTU.

Example 74

The apparatus of example 73, resonate coupling with the PTU may be at an operating frequency in the ISM radio band that includes 6.78 MHz.

Example 75

The apparatus of example 72, the PRU may be arranged to operate in compliance with one or more industry standards including Alliance for Wireless Power (A4WP), Version 1.0 Baseline System Specification or the Bluetooth Specification, Version 4.1.

Example 76

The apparatus of example 75, the beacon may include an A4WP beacon and the low energy wireless communication interface is a BLE interface.

Example 77

The apparatus of example 72, the PTU may include a laptop computer, a notebook computer, a netbook computer, a tablet computer, a smart phone, a wearable computing device or a portable game device.

Example 78

An example method may include receiving, at a power receive unit (PRU), a long beacon from a PTU capable of inductively, magnetically or wirelessly transferring power to the PRU. The method may also include energizing a low energy wireless communication interface responsive to receiving the long beacon. The method may also include generating a first ADV packet. The first ADV packet may include fields indicating support for forward signaling and no signature field. The method may also include transmitting the first ADV packet to the PTU. The PTU may be capable of modulating a remaining portion of the long beacon to include a modulated signature responsive to receiving the first ADV packet. The method may also include decoding the modulated signature included in the remaining portion of the long beacon. The method may also include generating a second ADV packet that includes the decoded signature. The method may also include transmitting the second ADV packet to the PTU to establish a communication link with the PTU through the low energy wireless communication interface. The method may also include receiving power from the PTU while maintaining the communication link.

Example 79

The method of example 78, the PTU may be capable of inductively, magnetically or wirelessly transferring power to the PRU via resonate coupling at an operating frequency in the ISM radio band that includes 6.78 MHz.

Example 80

The method of example 78, the PRU arranged may operate in compliance with one or more industry standards including Alliance for Wireless Power (A4WP), Version 1.0 Baseline System Specification or the Bluetooth Specification, Version 4.1.

Example 81

The method of example 80, long beacon may include an A4WP beacon and the low energy wireless communication interface may be a BLE interface.

Example 82

The method of example 78, the PTU may include a laptop computer, a notebook computer, a netbook computer, a tablet computer, a smart phone, a wearable computing device or a portable game device.

Example 83

An example at least one machine readable medium may include a plurality of instructions that in response to being executed on a system at a power receive unit (PRU) may cause the system to carry out a method according to any one of examples 78 to 82.

Example 84

An example apparatus may include means for performing the methods of any one of examples 78 to 82.

Example 85

An example at least one machine readable medium may include a plurality of instructions that in response to being executed by circuitry for a power receive unit (PRU) may cause the circuitry to receive a long beacon from a PTU capable of inductively, magnetically or wirelessly transferring power to the PRU. The instructions may also cause the circuitry to energize a low energy wireless communication interface responsive to receiving the long beacon. The instructions may also cause the circuitry to generate a first ADV packet. The first ADV packet may include fields indicating support for forward signaling and no signature field. The instructions may also cause the circuitry to transmit the first ADV packet to the PTU. The PTU may be capable of modulating a remaining portion of the long beacon to include a modulated signature responsive to receiving the first ADV packet. The instructions may also cause the circuitry to decode the modulated signature included in the remaining portion of the long beacon. The instructions may also cause the circuitry to generate a second ADV packet that includes the decoded signature. The instructions may also cause the circuitry to transmit the second ADV packet to the PTU to establish a communication link with the PTU through the low energy wireless communication interface. The instructions may also cause the circuitry to receive power from the PTU while maintaining the communication link.

Example 86

The at least one machine readable medium of example 85, the PTU may be capable of inductively, magnetically or wirelessly transferring power to the PRU via resonate coupling at an operating frequency in the ISM radio band that includes 6.78 MHz.

Example 87

The at least one machine readable medium of example 85, the PRU may be arranged to operate in compliance with one or more industry standards including Alliance for Wireless Power (A4WP), Version 1.0 Baseline System Specification or the Bluetooth Specification, Version 4.1.

Example 88

The at least one machine readable medium of example 87, the long beacon may include an A4WP beacon and the low energy wireless communication interface may be a BLE interface.

Example 89

The at least one machine readable medium of example 85, the PTU may include a laptop computer, a notebook computer, a netbook computer, a tablet computer, a smart phone, a wearable computing device or a portable game device.

Example 90

An apparatus for a power receive unit (PRU) may include means for receiving a long beacon from a PTU capable of inductively, magnetically or wirelessly transferring power to the PRU. The apparatus may also include means for energizing a low energy wireless communication interface responsive to receiving the long beacon. The apparatus may also include means for generating a first ADV packet. The first ADV packet may include fields indicating support for forward signaling and no signature field. The apparatus may also include means for transmitting the first ADV packet to the PTU. The PTU may be capable of modulating a remaining portion of the long beacon to include a modulated signature responsive to receiving the first ADV packet. The apparatus may also include means for decoding the modulated signature included in the remaining portion of the long beacon. The apparatus may also include means for generating a second ADV packet that includes the decoded signature. The apparatus may also include means for transmitting the second ADV packet to the PTU to establish a communication link with the PTU through the low energy wireless communication interface. The apparatus may also include means for receiving power from the PTU while maintaining the communication link.

It is emphasized that the Abstract of the Disclosure is provided will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry for a power transmit unit (PTU) capable of inductively, magnetically or wirelessly transferring power to one or more power receive units (PRUs);
   a detect component for execution by the circuitry to detect a first PRU based on use of a transmitted short beacon to detect an impedance or charging load associated with the first PRU;
   a beacon component for execution by the circuitry to transmit a long beacon that includes a first modulated signature, the long beacon to cause the first PRU to energize a low energy wireless communication interface;
   a receive component for execution by the circuitry to receive a first advertisement (ADV) packet from the first PRU;
   a connection component for execution by the circuitry to send a first connection request to the first PRU to establish a first communication link with the first PRU through the low energy wireless communication interface when the first ADV packet from the first PRU includes a signature that matches the first modulated signature; and
   a transfer component for execution by the circuitry to cause transfer of power to the first PRU while maintaining the first communication link;
   the receive component to receive a second ADV packet from a second PRU while power is being transferred to the first PRU, the second ADV packet including fields indicating support for forward signaling and no signature matching the first modulated signature;
   a power modulation component for execution by the circuitry to modulate power provided to the first PRU responsive to the receive component receiving the second ADV packet, the power modulated to generate a second modulated signature that is capable of being detected by the second PRU;
   the receive component to receive a third ADV packet from the second PRU;
   the connection component to send a second connection request to the second PRU to establish a second communication link with the second PRU through a low energy wireless communication interface at the second PRU when the third ADV packet includes a signature that matches the second modulated signature; and
   the transfer component to cause transfer of power to the second PRU while maintaining the second communication link.

2. The apparatus of claim 1, comprising the first and second modulation signatures, when decoded, result in a same signature.

3. The apparatus of claim 1, the first modulated signature comprising a sequence modulated on an amplitude of the long beacon, the sequence to indicate an identifier for the PTU.

4. The apparatus of claim 1, comprising a transmit resonator arrange to transfer power to the first PRU via resonate coupling with the first PRU.

5. The apparatus of claim 4, resonate coupling with the first PRU is at an operating frequency in the industrial, scientific and medical (ISM) radio band that includes 6.78 megahertz (MHz).

6. The apparatus of claim 1, comprising the PTU arranged to operate in compliance with one or more industry standards including Alliance for Wireless Power (A4WP), Version 1.0 Baseline System Specification or the Bluetooth Specification, Version 4.1.

7. The apparatus of claim 6, the short and long beacons comprising A4WP beacons and the low energy wireless communication interface is a Bluetooth low energy (BLE) interface.

8. An apparatus comprising:
   circuitry for a power transmit unit (PTU) capable of inductively, magnetically or wirelessly transferring power to one or more power receive units (PRUs);
   a detect component for execution by the circuitry to detect a first PRU based on use of a transmitted short beacon to detect an impedance or charging load associated with the first PRU;
   a beacon component for execution by the circuitry to transmit a long beacon to cause the first PRU to energize a low energy wireless communication interface;
   a receive component for execution by the circuitry to receive a first advertisement (ADV) packet from the first PRU including fields indicating support for forward signaling and no signature field, the beacon component to modulate a portion of the long beacon responsive to the receive component receiving the first ADV packet, the portion of the long beacon modulated to include a modulated signature, the receive component to receive a second ADV packet from the first PRU;
   a connection component for execution by the circuitry to send a connection request to establish a first communication link with the first PRU through the low energy wireless communication interface when the second ADV packet includes a signature that matches the modulated signature included in the portion of the long beacon;
   a transfer component for execution by the circuitry to cause transfer of power to the first PRU while maintaining the first communication link;
   the receive component to receive a second ADV packet from a second PRU while power is being transferred to the first PRU, the second ADV packet from the second PRU including fields indicating support for forward signaling and no signature matching the first modulated signature;
   a power modulation component for execution by the circuitry to modulate power provided to the first PRU responsive to the receive component receiving the second ADV packet from the second PRU, the power modulated to generate a second modulated signature that is capable of being detected by the second PRU;
   the receive component to receive a third ADV packet from the second PRU;

the connection component to send a second connection request to the second PRU to establish a second communication link with the second PRU through a low energy wireless communication interface at the second PRU when the third ADV packet from the second PRU includes a signature that matches the second modulated signature; and the transfer component to cause transfer of power to the second PRU while maintaining the second communication link.

9. The apparatus of claim 8, comprising the first and second modulation signatures, when decoded, result in a different signature.

10. The apparatus of claim 8, the first modulated signature comprising a sequence modulated on an amplitude of the portion of the long beacon, the sequence to indicate an identifier for the PTU.

11. The apparatus of claim 8, comprising a transmit resonator arrange to transfer power to the first PRU via resonate coupling with the first PRU.

12. The apparatus of claim 11, resonate coupling with the first PRU is at an operating frequency in the industrial, scientific and medical (ISM) radio band that includes 6.78 megahertz (MHz).

13. The apparatus of claim 8, comprising the PTU arranged to operate in compliance with one or more industry standards including Alliance for Wireless Power (A4WP), Version 1.0 Baseline System Specification or the Bluetooth Specification, Version 4.1.

14. The apparatus of claim 13, the short and long beacons comprising A4WP beacons and the low energy wireless communication interface is a Bluetooth low energy (BLE) interface.

15. A computer-implemented method, comprising:
    detecting a first power receive unit (PRU) based on use of a transmitted short beacon to detect an impedance or charging load associated with the first PRU;
    transmitting a long beacon that includes a first modulated signature, the long beacon to cause the first PRU to energize a low energy wireless communication interface;
    receiving an advertisement (ADV) packet from the first PRU;
    sending a first connection request to the first PRU to establish a first communication link with the first PRU through the low energy wireless communication interface when the first ADV packet from the first PRU includes a signature that matches the first modulated signature;
    causing transfer of power to the first PRU while maintaining the first communication link;
    receiving a second ADV packet from a second PRU while power is being transferred to the first PRU, the second ADV packet including fields indicating support for forward signaling and no signature matching the first modulated signature;
    modulating power provided to the first PRU responsive to the receive component receiving the second ADV packet, the power modulated to generate a second modulated signature that is capable of being detected by the second PRU;
    receiving a third ADV packet from the second PRU;
    sending a second connection request to the second PRU to establish a second communication link with the second PRU through a low energy wireless communication interface at the second PRU when the third ADV packet includes a signature that matches the second modulated signature; and
    causing transfer of power to the second PRU while maintaining the second communication link.

16. The method of claim 15, wherein the first and second modulation signatures, when decoded, result in a same signature.

17. The method of claim 15, the first modulated signature comprising a sequence modulated on an amplitude of the long beacon, the sequence to indicate an identifier for a power transmit unit (PTU).

18. The method of claim 15, comprising transferring, via a transmit resonator, power to the first PRU via resonate coupling with the first PRU.

19. At least one non-transitory machine readable medium comprising a plurality of instructions that in response to being executed by circuitry for a power transit unit unit (PTU) causes the circuitry to:
    detect a first power receive unit (PRU) based on use of a transmitted short beacon to detect an impedance or charging load associated with the first PRU;
    transmit a long beacon that includes a first modulated signature, the long beacon to cause the first PRU to energize a low energy wireless communication interface;
    receive an advertisement (ADV) packet from the first PRU;
    send a first connection request to the first PRU to establish a first communication link with the first PRU through the low energy wireless communication interface when the first ADV packet from the first PRU includes a signature that matches the first modulated signature;
    cause transfer of power to the first PRU while maintaining the first communication link;
    receive a second ADV packet from a second PRU while power is being transferred to the first PRU, the second ADV packet including fields indicating support for forward signaling and no signature matching the first modulated signature;
    modulate power provided to the first PRU responsive to the receive component receiving the second ADV packet, the power modulated to generate a second modulated signature that is capable of being detected by the second PRU;
    receive a third ADV packet from the second PRU;
    send a second connection request to the second PRU to establish a second communication link with the second PRU through a low energy wireless communication interface at the second PRU when the third ADV packet includes a signature that matches the second modulated signature; and
    cause transfer of power to the second PRU while maintaining the second communication link.

20. The at least one non-transitory machine readable medium of claim 19, wherein the first and second modulation signatures, when decoded, result in a same signature.

21. The at least one non-transitory machine readable medium of claim 19, the first modulated signature comprising a sequence modulated on an amplitude of the long beacon, the sequence to indicate an identifier for a power transmit unit (PTU).

22. The at least one non-transitory machine readable medium of claim 19, comprising a plurality of instructions that in response to being executed by circuitry for the PTU causes the circuitry to transfer, via a transmit resonator, power to the first PRU via resonate coupling with the first PRU.

* * * * *